United States Patent
Krijn et al.

(10) Patent No.: US 10,172,295 B2
(45) Date of Patent: Jan. 8, 2019

(54) METHOD FOR PROVIDING HORTICULTURE LIGHT TO A CROP AND LIGHTING DEVICE FOR HORTICULTURE LIGHTING

(71) Applicant: PHILIPS LIGHTING HOLDING B.V., Eindhoven (NL)

(72) Inventors: Marcellinus Petrus Carolus Michael Krijn, Eindhoven (NL); Gabriel-Eugen Onac, Eindhoven (NL); Alexander Jacobus Mariette Van Neer, Eindhoven (NL)

(73) Assignee: PHILIPS LIGHTING HOLDING B.V, Eindhoven (NL)

( * ) Notice: Subject to any disclaimer, the term of this patent is extended or adjusted under 35 U.S.C. 154(b) by 442 days.

(21) Appl. No.: 14/414,909

(22) PCT Filed: Jul. 12, 2013

(86) PCT No.: PCT/IB2013/055737
§ 371 (c)(1),
(2) Date: Jan. 15, 2015

(87) PCT Pub. No.: WO2014/013400
PCT Pub. Date: Jan. 23, 2014

(65) Prior Publication Data
US 2015/0181811 A1    Jul. 2, 2015

Related U.S. Application Data

(60) Provisional application No. 61/672,861, filed on Jul. 18, 2012.

(51) Int. Cl.
*A01G 7/04* (2006.01)
*F21V 21/00* (2006.01)
(Continued)

(52) U.S. Cl.
CPC .............. *A01G 7/045* (2013.01); *F21V 21/00* (2013.01); *F21V 23/001* (2013.01);
(Continued)

(58) Field of Classification Search
CPC .............. A01G 7/045; A01G 7/04; A01G 7/00
See application file for complete search history.

(56) References Cited

U.S. PATENT DOCUMENTS

| | | | | |
|---|---|---|---|---|
| 3,931,695 A | * | 1/1976 | Widmayer | A01G 7/045 47/17 |
| 2007/0253196 A1 | * | 11/2007 | Ormiston | A01K 63/06 362/231 |

(Continued)

FOREIGN PATENT DOCUMENTS

| | | |
|---|---|---|
| CN | 201129692 Y | 10/2008 |
| CN | 201225540 Y | 4/2009 |

(Continued)

*Primary Examiner* — Kristen C Hayes

(57) ABSTRACT

The invention provides a method for providing horticulture light (511) to a crop (1), the method comprising sideways illuminating the crop (1) with the horticulture light (511) of a lighting device (500), the lighting device (500) comprising a grid (530) comprising a plurality of light emitting diodes (LEDs) (510) and a plurality of through holes (570), wherein one or more of the plurality of LEDs (510) are configured to provide said horticulture light (511).

8 Claims, 12 Drawing Sheets

(51) Int. Cl.
*F21V 23/00* (2015.01)
*H05B 33/08* (2006.01)
*F21Y 105/10* (2016.01)
*F21Y 115/10* (2016.01)

(52) U.S. Cl.
CPC ...... *H05B 33/0854* (2013.01); *F21Y 2105/10* (2016.08); *F21Y 2115/10* (2016.08); *Y02P 60/146* (2015.11)

(56) References Cited

U.S. PATENT DOCUMENTS

| | | |
|---|---|---|
| 2010/0031562 A1 | 2/2010 | Browne |
| 2012/0020071 A1* | 1/2012 | McKenzie ............ A01G 7/045 362/231 |
| 2013/0000185 A1* | 1/2013 | Tanase ............... A01G 7/045 47/17 |
| 2013/0293156 A1* | 11/2013 | Wells ................. H05B 33/0803 315/312 |

FOREIGN PATENT DOCUMENTS

| | | |
|---|---|---|
| CN | 202109287 U | 1/2012 |
| CN | 102395828 A | 3/2012 |
| EP | 2433489 A2 | 3/2012 |
| JP | 3094466 U | 6/2003 |
| JP | 2007274905 A | 10/2007 |
| JP | 2009239235 A | 10/2009 |
| JP | 2012065638 A | 4/2012 |
| JP | 2012125196 A | 7/2012 |
| RU | 2369086 C1 | 10/2009 |
| WO | 2008126022 A1 | 10/2008 |
| WO | 2008139376 A1 | 11/2008 |
| WO | 2009038072 A1 | 3/2009 |
| WO | 2010067711 A1 | 6/2010 |
| WO | 2011013892 A2 | 2/2011 |
| WO | 2011117778 A1 | 9/2011 |

* cited by examiner

METHOD FOR PROVIDING HORTICULTURE LIGHT TO A CROP AND LIGHTING DEVICE FOR HORTICULTURE LIGHTING

CROSS-REFERENCE TO PRIOR APPLICATIONS

This application is the U.S. National Phase application under 35 U.S.C. § 371 of International Application No. PCT/IB2013/055737, filed on Jul. 12, 2013, which claims the benefit of U.S. Provisional Patent Application No. 61/672,861, filed on Jul. 18, 2012. These applications are hereby incorporated by reference herein.

FIELD OF THE INVENTION

The invention relates to a method for providing horticulture light to a crop, as well as to a lighting device for horticulture lighting. The invention further relates to some specific applications thereof.

BACKGROUND OF THE INVENTION

Horticulture lighting is known in the art. US2010031562, for instance, describes a lighting installation for use in greenhouse farming for lighting crops in a greenhouse, comprising a number of light sources, such as lamps, provided above the crops to be lighted, and a number of dimmer devices for the light sources, characterized in that the dimmer devices are provided with control means for periodically, automatically varying the light intensity of the light sources cooperating with the dimmer devices according to a predetermined pattern. US2010031562 aims to provide a method and lighting installation, respectively, for greenhouse farming. In particular, the light sources are divided into a number of groups, the lighting installation being designed such that, in use, the power of each group varies according to a predetermined pattern, while patterns of different groups are phase-shifted relative to each other such that the electric power consumed by the joint groups varies less than the sum of the power variations of the separate groups, more particularly such that the electric power consumed by the joint groups varies less than the power variation of a single group, more particularly still such that the electric power consumed by the joint groups varies to a smallest possible extent, or does, at least virtually, not vary. In particular, all patterns are the same, but only phase-shifted relative to each other.

SUMMARY OF THE INVENTION

Plants use the process of photosynthesis to convert light, $CO_2$ and $H_2O$ into carbohydrates (sugars). These sugars are used to fuel metabolic processes. The excess of sugars is used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:

photoperiodism refers to the ability that plants have to sense and measure the periodicity of radiation (e.g. to induce flowering), phototropism refers to the growth movement of the plant towards and away from the radiation, and photomorphogenesis refers to the change in form in response to the quality and quantity of radiation.

Two important absorption peaks of chlorophyll a and b are located in the red and blue regions, especially from 625-675 nm and from 425-475 nm, respectively. Additionally, there are also other localized peaks at near-UV (300-400 nm) and in the far-red region (700-800 nm). The main photosynthetic activity seems to take place within the wavelength range 400-700 nm. Radiation within this range is called photo synthetically active radiation (PAR).

Other photo sensitive processes in plants include phytochromes. Phytochrome activity steers different responses such as leaf expansion, neighbor perception, shade avoidance, stem elongation, seed germination and flowering induction. The phytochrome photo system includes two forms of phytochromes, Pr and Pfr, which have their sensitivity peaks in the red at 660 nm and in the far-red at 730 nm, respectively.

In horticulture, the photosynthetic photon flux density (PPFD) is measured in number of photons per second per unit of area (in $\mu mol/sec/m^2$; a mol corresponding to $6 \cdot 10^{23}$ photons). In practice, when applying e.g. inter-lighting (see below), especially for tomatoes, the red PPFD used may be typically 200 $\mu mol/sec/m^2$ and the ratio blue:red may be typically 1:7 (with red and blue ranging from 625-675 nm and from 400-475 nm respectively). Especially, the photosynthetic photon flux density may comprise about 10% blue and about 90% red. The PPFD can be determined from a photodiode or measured directly with a photomultiplier.

Plant growth depends not only on the amount of light but also on spectral composition, duration, and timing of the light on the plant. A combination of parameter values in terms of these aspects is called "light recipe" for growing the plant.

LEDs can play a variety of roles in horticultural lighting such as: Supplemental lighting: Lighting that supplements the natural daylight is used in order to increase production (of tomatoes for example) or extend crop production during e.g. the autumn, winter, and spring period when crop prices may be higher.

Photoperiodic lighting: The daily duration of light is important for many plants. The ratio of the light and dark period in a 24 hour cycle influences the blossoming response of many plants. Manipulating this ratio by means of supplemental lighting enables regulating the time of blossoming.

Cultivation without daylight in plant factories.
Tissue Culture.

For providing supplemental lighting during autumn, winter and spring in green-houses (or all-year round in multilayer growth), in general high-power gas-discharge lamps are used that have to be mounted at a relative high location above the plants to ensure sufficiently uniform light distribution across the plants. At present, in green houses different types of high power lamps ranging from 600 up to 1000 W (e.g. high power HID) are used to provide plants with supplemental light. One drawback is that from the location above the plants the amount of light reaching the lower parts of the plant is rather limited. At the same time the lower parts of the plant are often most in need of supplemental light. The same dilemma persists when using solid state lighting that is mounted above the plants. Nevertheless, LED lighting, especially solid state lighting, has some advantages over discharge based lighting.

Hence, it is an aspect of the invention to provide an alternative lighting device for horticulture application and/or an alternative lighting method for horticulture application, which preferably further at least partly obviate one or more of above-described drawbacks.

It is e.g. suggested to locate the lamps in between the plants. Especially when using LEDs this is a possibility since LEDs can be distributed such as to provide a rather uniform illumination in between the plants without causing burning of the leaves of the plants in contact with the LEDs. This method of supplemental lighting is called inter-lighting (see also FIG. 1). However, as described below, LED lighting may in a specific embodiment also be used to non-uniformly illuminate horticulture or crop parts; for instance to address different parts of the horticulture (such as fruits), different spectral distributions of the light may be desired.

To develop fruit weight, appearance, and physical strength, crops use various parts of the spectrum for various processes. In particular the photons in the blue and red region of the spectrum, with a wavelength between 440-470 nm and around 660 nm, respectively, are absorbed and used efficiently by the plant for photosynthesis, but also other developmental processes. Consequently, to maximize the yield per amount of emitted photons, the spectral composition of the light source should preferably be limited to the specific spectral regions leading to the best result. Therefore, due to the narrow spectral emission range, LEDs are very suitable and very efficient for horticultural applications.

Zooming into the specific needs of the various plants, it becomes obvious that various plants can benefit from a unique spectral light composition. To give an example, some plants in some growth stages may require an amount of about 5% blue light and about 95% red light, while other plants and/or other growth stages of the plants may need about 10% blue light and about 90% red light for best growth and development (see also above). Furthermore, some plants may develop more efficiently when extending the spectrum to the far red, i.e. beyond 675 nm, such as in the range 675-800 nm, like about 750 nm. Consequently, every type of crop requires a specific spectrum and thus a specific LED choice/combination, resulting in an enormous amount of different LED types and numbers. Hence, for horticultural lighting it means that one needs either a broad product range to cover the specific needs of the crop while at the same time being efficient in energy use, having low product cost, or one needs a product that is flexible and still affordable in terms of LED module production cost and plant growers' cost of ownership.

Herein, it is suggested to provide a (supplemental) lighting luminaire (herein further indicated as "lighting device") which can be located in between the plants ("crops" or "horticulture crops") and which may be based on, in an embodiment, an open grid or mesh of LEDs with connecting wires, wherein the grid or mesh of LEDs defines a grid plane, and wherein especially the LEDs are configured to provide horticulture light in beams of light having optical axes perpendicular to the grid plane (see further also below). The orientation of the LEDs may, in an embodiment, alternate between sending light from the front (F), or first side, and from the back (B), or second side, of the grid. Hence, subsets (or LED arrangements) of the total number of LEDs may be configured anti-parallel with respect to each other (see further also below). Note that front an back can—dependent upon the configuration—be interchanged.

Further, in an embodiment, the LEDs may be grouped such that the driving voltage may be kept constant irrespective the size of the LED grid. Especially, in an embodiment, the LEDs in the grid may emit different colours of light. All LEDs emitting a certain colour may be arranged in a sub-grid (subset) and sub-grids may be interweaved to maximize illumination uniformity. In an embodiment, the LEDs and current wires are covered with a transparent plastic or foil e.g. sandwiched between two sheets of plastic with holes at appropriate locations corresponding with openings in the grid.

Next to the fact that the luminaire may be configured to be located in between the (future) crops, the lighting device may also be applied as a top luminaire for multi-layer growth. This concept may thus be applied in inter-lighting but also in other types of lighting, such as top lighting, including multi-layer lighting (see below). Hence, the invention is not limited to inter-lighting applications.

In a first aspect, the invention provides a method for providing (supplemental) horticulture light to a crop comprising illuminating the crop with the horticulture light of a lighting device, the lighting device comprising a grid comprising a plurality of light emitting diodes (LEDs) and through holes; the LEDs are configured to provide (during use) said (supplemental) horticulture light. In an embodiment, the method provides sideways illumination of the crop.

Especially, the grid comprises a grid plane, and the LEDs are configured to provide (during use) said horticulture light in beams of light having optical axes, and the LEDs are configured to provide (during use) said horticulture light in said beams of light having said optical axes configured perpendicular to said grid plane.

In yet a further aspect, the invention provides a lighting device ("device"), which can be used in such method, comprising a grid comprising a plurality of light emitting diodes (LEDs) and comprising through holes, wherein the LEDs are especially configured to provide (during use) said (supplemental) horticulture light in beams of light having optical axes, and wherein the LEDs are configured to provide (during use) said horticulture light in said beams of light having optical axes configured perpendicular to said grid plane. In an embodiment, the lighting device is arranged to illuminate the crops sideways.

An advantage of this (optionally color tunable) device and this (optionally color tunable) illumination method is that different types of horticulture crops, but also horticulture crops in different stages, and even different parts of the crops can be illuminated with light that fits best with the light demand of the type of crop, its stage and/or the respective crop part, in a relatively easy way. Further, due to the presence of the through holes, transport of gas and/or pollination may not be hampered. The presence of the through holes may be beneficial in controlling and maintaining the climate (carbon dioxide control, humidity control, etc.) in a horticulture environment such as a greenhouse, as the horticulture lighting device is less obstructive for these control processes. The presence of the through holes also improves the availability of ambient and/or outdoor light at the horticulture plants.

Especially, the device may allow and the method may include varying the spectral intensity distribution of the horticulture light as a function of one or more of (a) the addressed part of the crop, (b) the time of the day, (c) the light intensity and light distribution of other light than the horticulture light, (d) the type of crop, (e) the growth stage of the crop, (f) the stage of a fruit (of a crop), (g) the time to harvest, (h) the time from harvest, and (i) position in horticulture arrangement (comprising a plurality of crops). Hence, in an embodiment in fact a color tunable device and method are provided, that are suitable for (supplemental)

horticulture lighting, and which may address at the appropriate time the appropriate photoreceptors at the appropriate crop part.

The lighting device is especially configured to generate horticulture light. The term "horticulture light" may especially relate to light having a spectral distribution with at least light intensity at a first wavelength selected from the range of 400-475 nm and at a second wavelength selected from the range of 625-800 nm, especially at least 625-675 nm. This does not imply that the light from the lighting device, when switched on, will always include intensity in both regions. Temporarily, the lighting device may provide light with intensity in only one of the spectral ranges, such as blue light or (far) red light. Further, due to the fact that the device comprises a plurality of LEDs, it may well be that one or more LEDs mainly give blue light, while one or more other LEDs may mainly give (far) red light (see also below). The term "horticulture light" may additionally or alternatively also include light having a spectral distribution with at least light intensity at a first wavelength selected from the PAR range (and optionally also beyond PAR, i.e. beyond 700 nm, see further also below). The phrase "wavelength selected from the range" may also include the use of band emitters, even band emitters that also emit outside the range, though at least emitting at a wavelength in said range. This phrase may especially, but not exclusively, include emitters that have a dominant emission wavelength in this range.

LEDs may be applied that generate the herein indicated wavelengths per se, and/or LEDs may be applied that in combination with a conversion material, such as an organic or inorganic dye, provide the light with the indicated wavelength(s). For instance, LED(s) may be configured to generate light having an emission wavelength selected from the range of 400-475 nm as blue emitter, and such LED(s) may also be applied to generate LED light based on a partial or complete conversion of the LED light by an organic or inorganic dye into another or overlapping wavelength or wavelength range (such as the herein indicated in the range of 625-800 nm). The term "dye" may also relate to a plurality of dyes.

The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). The term "crop" is used herein to indicate the horticulture plant that is grown or was grown. Plants of the same kind grown on a large scale for food, clothing, etc., may be called crops. A crop is a non-animal species or variety that is grown to be harvested as e.g. food, livestock fodder, fuel, or for any other economic purpose. The term "crop" may also relate to a plurality of crops. Horticulture crops may especially refer to food crops (tomatoes, peppers, cucumbers and lettuce), as well as to plants (potentially) bearing such crops, such as a tomato plant, a pepper plant, a cucumber plant, etc. Horticulture may herein in general relate to e.g. crop and non-crop plants. Examples of crop plants are Rice, Wheat, Barley, Oats, Chickpea, Pea, Cowpea, Lentil, Green gram, Black gram, Soybean, Common bean, Moth bean, Linseed, Sesame, Khesari, Sunhemp, Chillies, Brinjal, Tomato, cucumber, Okra, Peanut, Potato, Corn, Pearlmillet, Rye, Alfalfa, Radish, Cabbage, lettuce, pepper, Sunflower, Sugarbeet, Castor, Red clover, White clover, Safflower, Spinach, Onion, Garlic, Turnip, Squash, Muskmelon, Watermelon, Cucumber, Pumpkin, Kenaf, Oilpalm, Carrot, Coconut, Papaya, Sugarcane, Coffee, Cocoa, Tea, Apple, Pears, Peaches, Cherries, grapes, Almond, Strawberries, Pine apple, Banana, Cashew, Irish, Cassava, Taro, Rubber, Sorghum, Cotton, Triticale, Pigeonpea, and Tobacco. Especial of interest are tomato, cucumber, pepper, lettuce, water melon, papaya, apple, pear, peach, cherry, grape, and strawberry.

Horticulture crops may especially be grown in a greenhouse. Hence, the invention especially relates to the application of the device and/or the method in a greenhouse. The device may be arranged between plants, or between plants to be, which is referred to as "inter-lighting". Horticulture growth on wires, like tomato plants, may be a specific field of application for inter-lighting, which application may be addressed with the present device and method. The device may also be arranged on top of plants or plants to be. Especially when horticulture crops are grown in layers on top of each other, artificial lighting is necessary. Growing horticulture crops in layers is indicated as "multi-layer growth" and may take place in a plant factory. Also in multi-layer growth, the device and/or method may be applied.

Therefore, in a further aspect, the invention provides also a horticulture application, which may also be referred to as a horticulture site, especially selected from the group comprising a greenhouse and a plant factory, wherein the horticulture application further comprises the lighting device, such as described herein. In an embodiment, such horticulture application comprises a plurality of said lighting devices, wherein said lighting devices are optionally configured to illuminate crops sideways within said horticulture application. In another embodiment, the horticulture application comprises multiple layers for multi-layer crop growth, the horticulture application further comprising a plurality of said lighting devices, configured for lighting the crops in said plurality of layers. In embodiments where inter-lighting is used, the LED grid will in general be arranged vertical, whereas in embodiment with multi-layer crop growth, the LED grid will in general be arranged horizontal, although (smaller size) inter-lighting may also be applied in multi-layer crop growth.

Especially in greenhouses wherein horticulture crops are grown in rows (which can be indicated as horticulture arrangement), the method of the invention may be applied to realize a sideways illumination of the crop, which may also be referred to as side lighting. The phrase "sideways illumination of the crop" especially indicates a configuration of the lighting device such that during at least part of the growth process of the crop, the crop is illuminated from a side. This does not exclude (additional) top lighting, but at least the lighting device of the method of the invention is configured in such a way that the crop is lit from a side of the crop during at least part of the growth process of the crop. Assuming a growth of crops in rows, at least part of the lighting device, especially at least part of its light emitting surface, may be arranged in between the rows of crops. Hence, at least part of the horticulture light of the lighting device used in a method according to an embodiment of the invention may have a horizontal propagation component and illuminate one or more crops. With known top lighting arrangements in current greenhouses this is not possible. An advantage of side lighting is that the crops may be better (more integrally) illuminated, energy use is more efficient and thus total energy consumption may be reduced, and especially with the device of the invention, it may be possible to selectively drive a part of the device to illuminate the whole or part of a crop (e.g. dependent upon the height of the crop and/or the part of the crop to be illuminated) and/or select a specific color to meet the demand of the crop in a specific stadium.

The term "grid" especially relates to a network. In a LED grid, the LEDs are arranged within this network or on the network, or part of the total number of LEDs are arranged in the network or on the network. Hence, the term "grid" may also relate to a circuit or LED circuit. The grid especially includes a 2D arrangement, array or matrix of LEDs. Hence, the grid may also be indicated as 2D grid or matrix. In a specific embodiment, the grid comprises, or is, a wire mesh. The "grid" is herein also indicated as "LED grid".

The term "grid" may also indicate a system that has a length and height that are substantially larger than the width, such as over 10 times larger. As indicated below, the grid may have an area of 0.5 m² or much larger (i.e. the area covered by the grid or grid surface area), whereas the thickness may only be a few mm, or up to a few cm. The grid may be flexible (see also below). The grid has a first side (front) and a second side (back), which are arranged opposite of each other, and from one or both sides horticulture light may emanate (during use of the lighting device). The surface areas of the front and back sides and the coverage area of the grid (in the plane of the grid) are in general the same. The grid also defines a (virtual) grid plane, which will in general thus be parallel to the first side and second side, which are herein also indicated as front (side) and back (side). The grid may therefore also be referred to as a "planar grid", not limited to flat or rigid. The through holes are from the first side to the second side.

Especially, the LEDs may be configured to provide said horticulture light in beams of light having optical axes, wherein preferably said optical axes are configured perpendicular to said grid plane. Especially, this may apply to at least 75% of the total number of LEDs of the device, such as at least 90% of the plurality of LEDs.

Hence, the LEDs may be configured to provide (during use) said horticulture light in beams of light having optical axes perpendicular to said grid plane. Hence, a vertically arranged grid may provide beams of light propagating horizontally. The term "perpendicular" may also relate to "substantially perpendicular". Perpendicular may therefore relate to e.g. 90°±10%, such as especially 90°±5%, such as 90°±1%. Likewise, the term "horizontal" may refer to "substantially horizontal", with slight deviations, like within 10°, especially within 5°, such as within 1°, from the earth's surface.

As indicated above, in an embodiment part of the total number of LEDs may provide light emanating from the back of the grid and part of the total number of LEDs may provide light emanating from the front of the grid. Hence, especially the plurality of light emitting diodes may comprise two or more subsets of LEDs, wherein the LED(s) of one or more of said subsets are configured to provide beams of light in an opposite direction to the LED(s) of one or more other subsets. These two or more subsets may be independently controllable.

Hence, the device may also comprise a plurality of subsets to provide light from a first side of the device, the subsets configured to provide light with different spectral light distributions, and a plurality of subsets to provide light from a second side of the device, the subsets configured to provide light with different spectral light distributions, wherein all these (back and front) subsets are independently controllable. A further parameter may be the position of the LED(s) or subset(s) of LED(s), by which the spatial distribution of the spectral light may be controlled; see further below.

The lighting device, especially the grid, may span an area of for instance 0.5-400 m², such as 2-400 m². The number of LEDs per m² (LED density) may for instance be in the order of 1-400, such as 4-100, though there may be grids with more or even with less LEDs (per square meter). Note that the distribution of the LEDs over the grid may be regular or may vary in different areas in the grid. In general, the LEDs will be arranged in a regular pattern, though other patterns may not be excluded. The device may comprise for instance at least 16 LEDs. In an embodiment, the device comprises n×m LEDs, wherein n is at least 4, and m is at least 4, such as at least 10.

The LEDs are especially solid state LEDs, but may optionally also be organic LEDs. Also combinations of solid state and organic LEDs may be applied. The term "LED" may also relate to a plurality of LED dies. Hence, in an embodiment, at a single LED position, a plurality of LED dies may be arranged, such as a LED package of 2 or more LED dies. The term "LED" may also relate to a LED package.

The advent of solid state lighting based on LEDs offers opportunities for application in horticulture. The main advantages of using LEDs result from the possibility to control the spectral composition of the light to closely match the plant's photoreceptors' sensitivity. Together with additional benefits like improved heat control and freedom of distributing the LEDs, this provides a more optimal production and enables influencing the plant's morphology and composition. It also promises a reduced energy consumption (and associated cost).

Solid state LEDs are easily integrated into digital control systems, facilitating lighting programs such as "daily light integral" lighting and sunrise and sunset simulations. LEDs are safer to operate than current lamps because they do not have glass envelopes and do not contain mercury.

LEDs enable one to distribute the light closer to the target which can result in less loss through the roof and into the floor of the greenhouse. Moreover a better light distribution in the crop can be accomplished. This is certainly the case for high-wire crops like tomatoes.

As indicated above, one or more LEDs may comprise converter material(s), such as one or more of an inorganic dye and an organic dye, for at least partially converting the LED light into light having another wavelength.

The lighting device may be a flexible lighting device. For instance, it may be a flexible (2D) wire grid or a flexible mesh. The lighting device may suspend from a roof or ceiling, or may be provided in a frame (such as between rails that may also be used as or include electrical conductors), etc.

In an embodiment, the plurality of light emitting diodes comprise two or more independently controllable subsets of light emitting diodes, wherein optionally two or more of said subsets are arranged at different heights, and wherein the method further includes providing horticulture light by one or more of said subsets as a function of the height of the crop or the (height) area of the crop to be illuminated. The two or more subsets are independently controllable, such as by a control unit. In this way, the on-off status, and optionally the intensity and/or optionally the color, of the two or more subsets may individually be controlled. The LEDs may be arranged in and/or on a (conductive) wire grid.

In an embodiment, the first subset comprises a plurality of light emitting diodes. In another embodiment, the second subset comprises a plurality of light emitting diodes. In yet another embodiment, the first subset comprises a plurality of light emitting diodes and the second subset comprises a plurality of light emitting diodes.

The invention also relates in some embodiments to a method and/or device wherein the plurality of light emitting diodes comprises two or more independently controllable subsets of light emitting diodes, wherein at least two of said subsets are configured to generate light having different spectral distributions. Especially, the method may further include varying the spectral distribution of the horticulture light as a function of one or more of (a) the addressed part of the crop, (b) the time of the day, (c) the light intensity and light distribution of other light than the horticulture light, (d) the type of crop, (e) the growth stage of the crop, (f) the stage of a fruit (of the crop), (g) the time to harvest, (h) the time from harvest, and (i) a position in a horticulture arrangement comprising a plurality of crops. As indicated above, the method and lighting device may be used for supplemental horticulture lighting.

As in an embodiment, different subsets of the plurality of LEDs may provide different types of light such that the spectral distribution may be tuned to the needs of the horticulture processes. In an embodiment, the spectral distribution may be changed over time and in another embodiment, the spectral distribution may be changed spatially e.g. in the height direction of the device. In this way, e.g. fruit parts may receive another type of light than leaves parts. In an embodiment, one or more of said subsets are configured to provide light having a first wavelength selected from the range of 400-475 nm, and one or more of said subsets are configured to provide light having a second wavelength selected from the range of 600-800 nm. In a specific embodiment, the first subset is configured to generate first light having a first spectral distribution with at least light intensity at said first wavelength. The second subset may in an embodiment be configured to generate second light, having a second spectral distribution with at least light intensity at a red wavelength selected from the range of 625-675 nm and/or at a far red wavelength, larger than the red wavelength, selected from the range of 675-760 nm. Especially both wavelength ranges may be represented and may be part of the horticulture light (especially the second light).

Especially, a first subset of the plurality of light emitting diodes is configured to emit (during use) light having a spectral light distribution substantially in the range of 400-475 nm, and a second subset of the plurality of light emitting diodes is configured to emit (during use) light having a spectral light distribution substantially in the range of 625-800 nm.

As indicated above, the lighting device may comprise two or more subsets of LEDs. The first subset and the second subset may have LEDs arranged in an elongated shape with subsets arranged parallel. For instance, two or more subsets of LEDs may be provided as elongated subsets, like in the form of rows of LEDs. In this way, a lighting device may be provided wherein strips may provide light with different spectral distributions. These two or more subsets may be independently controllable.

The lighting device may comprise a plurality of first subsets and a single second subset. In yet another embodiment, the lighting device comprises a single first subset and a plurality of second subsets. In yet another embodiment, the lighting device comprises a plurality of first subsets and a plurality of second subsets.

These plurality of first subsets and second subsets may be arranged as parallel rows of LEDs, but may also be arranged in a chess (chequer) board way. Hence, in an embodiment the first subsets and the second subsets are configured in a grid of alternating first subsets and second subsets (such as elongated parallel arrangements or chess board arrangements). An advantage of especially the latter is that dedicated parts of the horticulture crop or the horticulture arrangement (see below) may be illuminated with a "high" spatial resolution. With about the same resolution, a color of the horticulture light may be selected and provided at the right position. Hence, the lighting device in an embodiment may comprise "color pixels", that can be switched on and off, by which the spectral intensity distribution of the horticulture light can be varied, e.g. as a function of one or more of (a) the addressed part of the crop, (b) the time of the day, (c) the light intensity and light distribution of other light than the horticulture light, (d) the type of crop, (e) the growth stage of the crop, (f) the stage of a fruit (of a crop), (g) the time to harvest, (h) the time from harvest, and (i) position in horticulture arrangement. Instead of a chess board configuration, also a hexagonal arrangement may be applied. In principle, also non-symmetric arrangements of the LEDs in a subset or of the pluralities of subsets in the device may be possible.

LED's in the grid providing the same type of light may be arranged with a pitch, i.e. a mutual distance (especially assuming a regular arrangement) between two nearest neighbors LEDs of the same type. In a specific embodiment the plurality of LEDs are arranged with a pitch, wherein the LED's are further arranged at a mean distance from the crops, wherein the ratio of this distance over the pitch is at least 0.2, especially at least 0.25, such as at least 0.3. By tuning the pitch of the LEDs and/or the distance from the LEDs to the crop, optimal and uniform lighting may be provided. It appears that below this ratio, lighting may be less homogenous than desired, and that above this ratio, lighting is homogenous enough. The lighting device and/or crops may be arranged in such a way, that the distance over pitch ratio requirement is fulfilled during a substantial part of the lifetime of the crop. In a specific embodiment, the plurality of light generating parts have a pitch in the range of 5-30 cm, even more especially 5-25 cm, such as 20 cm. In this way, light received by the crop(s) may be substantially homogeneously distributed. When, in embodiments, there are multiple pitches (for example in two orthogonal directions), especially one of the pitches fulfill the herein indicated criteria, even more especially both pitches fulfill the herein indicated criteria. The skilled person will appreciate that also optical light distribution properties of the LEDs and/or the grid structures, such as for example a light emission angle of the LEDs or light diffusion/scattering property of the grid, need to be taken into account next—to the distance over pitch ratio—to determine a suitable position of the lighting device relative the crops in order to obtain a homogeneous light distribution at the crops.

As indicated above, the lighting device may comprise through holes. Assuming an horticulture arrangement with rows of growing crops, with lighting devices arranged in between the rows, air may flow around the crops and between the rows, without substantial hindrance, or at least without being entirely blocked over the whole area of the lighting device. The through holes allow air flow, but may also reduce shade areas. In a specific embodiment, the grid has a coverage or surface area, wherein the through holes have cross-sectional areas, wherein the total area of the cross-sectional areas of the through holes is in the range of 50-95% of the grid coverage area, which may especially provide above mentioned beneficial effects.

In a specific embodiment, the lighting device comprises a LED grid, said LED grid comprising:

LEDs arranged in a matrix, with each LED connected within the matrix by connecting wires, and the matrix connected to voltage rails, wherein the voltage rails are connected to at least three power rail lines distributed across the area of the matrix, wherein the LEDs are formed as:

a first subset of LEDs arranged between a first power rail line and a second, adjacent, power rail line;

a second subset of LEDs arranged between the second power rail line and a third power rail line of the same voltage as the first power rail line.

Optionally, the third power rail line may be adjacent the second power rail line and on the opposite side of the second power rail line compared to the first power rail line.

In this design, the LEDs may thus be arranged in sections between successive pairs of power rail lines—rather than all between a single pair of voltage rails. In this way, the driving voltage can be kept low and tuned to an optimum value (optimum from the point of view of energy consumption, cost, and safety for example).

The LEDs in a subset may have their anodes connected to a higher voltage power rail line and their cathodes connected to a lower voltage power rail line, so that the different sections are arranged with opposite polarity. By placing the LEDs in sections with different polarity direction, not only is it possible to drive the LEDs at a low (i.e. safe) voltage, but a modular approach for the power supply is also possible. The LED matrix as well as the arrangement of the subsets can have arbitrary dimensions. It also allows the multiple subsets of LEDs of the matrix to be addressed individually if desired. The subsets of LEDs can be arranged in the row or column direction, so that addressing row-by-row, or column-by-column, is made possible.

There can be a number N of power rail lines and a number N−1 of subsets of LEDs, each between an adjacent pair of the power rail lines, wherein the adjacent pair of power rail lines comprises one high power rail line and one low power rail line. In this way, the design is scalable in two dimensions. The power rail lines may alternate in a first direction (for example a row direction), and the design can be scaled based on the number of power rail lines, and without changing the power rail line voltages.

The design can also be scaled in the perpendicular direction, by changing how many LEDs are in each arrangement.

For example, the first subset of LEDs can comprise an LED bank between a first power rail line and a second power rail line, the first LED bank comprising one or more LEDs in parallel, and the second subset of LEDs can comprise a second LED bank between the second power rail line and the third power rail line, the second LED bank comprising one or more LEDs in parallel.

The number of LEDs in parallel in each bank can be used to determine the scaling for a fixed number of power rail lines.

The first subset of LEDs can comprise a first plurality of LED banks in series between the first power rail line and the second power rail line, each bank again comprising one or more LEDs in parallel, and the second subset of LEDs can comprise a second plurality of LED banks in series between the second power rail line and the third power rail line, each bank comprising one or more LEDs in parallel.

The number of banks in series between the pair of power rail lines determines the required voltages. Thus a compromise can be found between the required voltage range and the number of power rail lines.

Each of the power rail lines can be connected to one of a high voltage rail and a low voltage rail. Furthermore, all high voltage power rail lines can be connected together and all low voltage power rail lines can be connected together. This means only one external high voltage line connection is needed and only one external low voltage line connection is needed.

A switching arrangement can be provided between each adjacent pair of power rail lines. This enables a shorting function to be implemented so that the LEDs coupled between a particular pair of power rail lines can be dimmed or turned off. This can be used to control the overall output brightness, or even the output color, if different LEDs have different color output. For example, the LEDs of the first subset of LEDs can have a different output color to the LEDs of the second subset of LEDs.

The lighting device can further comprise a power source with first and second voltage lines connected to the LED matrix, with one of the first and second voltage lines connected to each of the power rail lines. Thus, the power rail lines essentially distribute two voltage lines across the matrix, so that the matrix can be scaled without changing the voltage line voltages.

A separate power source can be connected to each of the higher voltage power rail lines, and/or a separate power source can be connected to each of the lower voltage power rail lines. When the grid is scaled, power sources can be added/removed as required without redesigning the remaining power sources. Each of the separate power sources can have an individually controllable output current, and this can be used to implement local dimming or locally turning off LEDs.

In another aspect, the invention provides a method of driving an LED grid, comprising:

connecting an array of LEDs in a matrix, with each LED connected within the matrix by connecting wires, and the matrix connected to voltage rails which are connected to at least three power rail lines distributed across the area of the matrix, wherein the method comprises:

controlling the at least three power rail lines, thereby to drive a first subset of LEDs between a first power rail line and a second, adjacent, power rail line and to drive a second subset of LEDs between the second power rail line and a third power rail line of the same voltage as the first power rail line, the third power rail line in an embodiment being adjacent the second power rail line and on the opposite side of the second power rail line compared to the first power rail line.

The plurality of LEDs may be embedded in a transparent foil. Especially, the transparent foil comprises through holes from a first side of the foil to a second side. These through holes may substantially coincide with the above-mentioned through holes of the grid, or may even be these through holes. Especially, the foil has a foil area, and wherein the through holes have cross-sectional areas, wherein the total area of the cross-sectional areas of the through holes is in the range of 50-95% of the foil area. Again, this may be beneficial for climate control, as e.g. air flow may be hindered substantially less than with a closed lighting device.

The invention provides a new way of artificial lighting used to stimulate plant growth and development, a technique that is known as horticultural lighting. In particular, there are two major horticultural environments in which artificial lighting is used. Firstly, greenhouses where crop yield is increased using top lighting and intra-canopy lighting in addition to daylight. Secondly, multilayer systems wherein the crops are grown mainly without daylight and, thus, depend heavily on artificial lighting. In this invention disclosure we consider optimized LED-based supplemental lighting luminaires for high-wire crops like tomatoes, cucumbers, and sweet peppers (paprikas) in greenhouses as well as for multi-layer crop growth in plant factories.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 5 shows a second example of an LED grid according to the invention; with

DETAILED DESCRIPTION OF THE EMBODIMENTS

Figure 1:
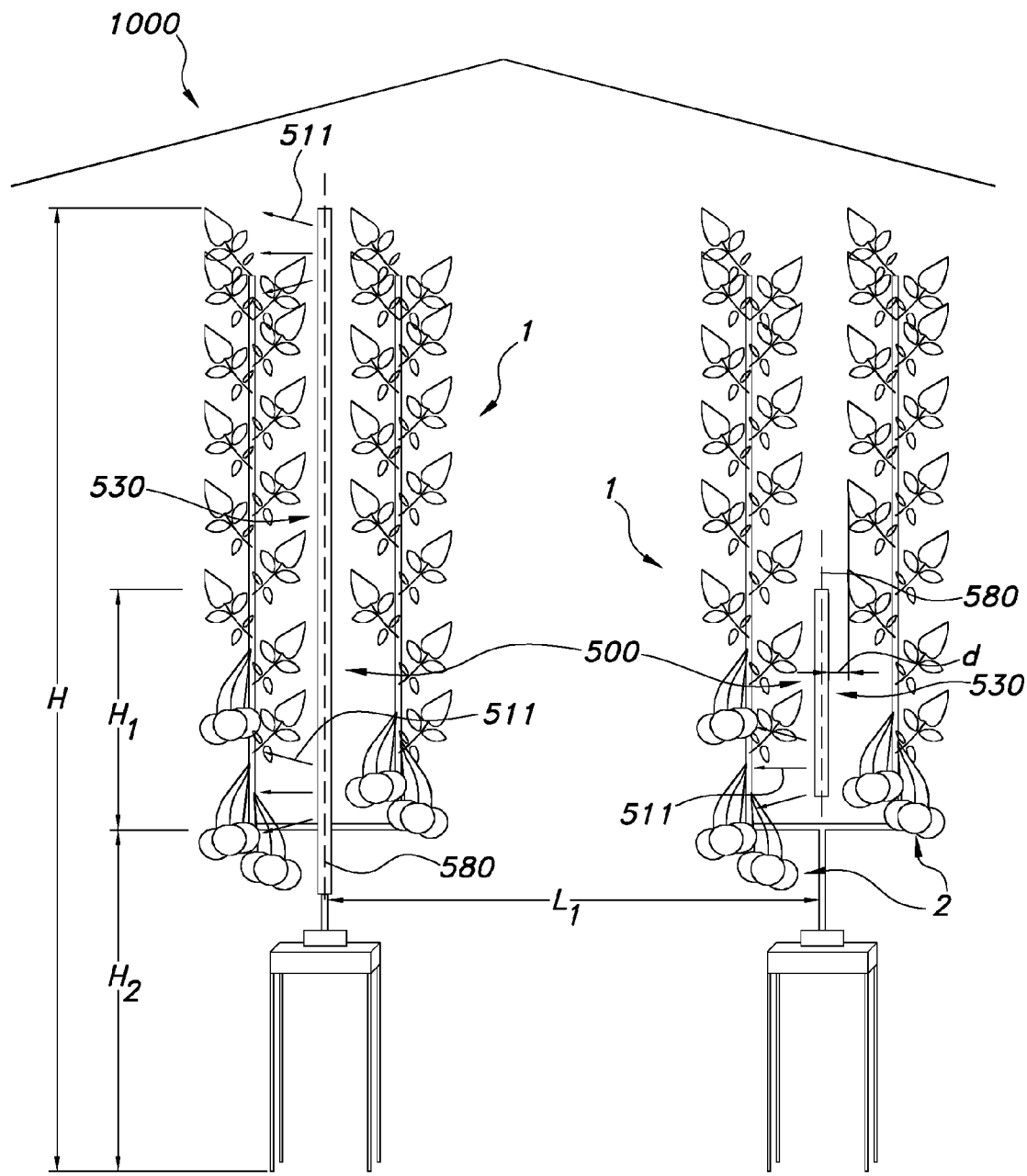
FIGS. 1-2 schematically depict some applications.

FIG. 1 schematically depicts a horticulture application for e.g. tomato growth. The horticulture crop is indicated with reference 1. Reference 2 indicates the possible fruit(s), tomatoes in the case. The tomato crop is only used as example to illustrate some aspects.

The crops or tomato plants are arranged in rows. The interdistance between the rows, and hence between the plants, is indicated with reference L1, and can for instance be in the range of 1-2 m, such as 1.5 m. The total height from ground level, indicated with reference H may e.g. be in the range of 2-4 m, such as about 3 m. The part of this total height which is especially relevant for horticulture lighting may cover a height H1, and is in the range of 0.5-1 m, and is about a height H2 above ground level, which height H2 may be in the range of 0.5-1.5 m, especially about 1 m. The lighting device, indicated with reference 500, may especially address the horticulture crop over said height H1; however, on the left side a relative high lighting device 500 is shown, just by way of example. Reference d indicates the distance between the (light emitting surface(s) of the) lighting device 500 and the crop 1. Reference 511 indicates the horticulture light that may be generated by the lighting device 500. As indicated above, over the height and/or the length of the lighting device 500, the horticulture light 511 may differ in intensity and spectral distribution.

Reference 1000 indicates a horticulture application, here by way of example a greenhouse. A plurality of rows of crops 1 may be indicated as the horticulture arrangement.

The device 500 may comprise a plurality of light emitting diodes. This plurality of light emitting diodes may comprise in an embodiment two or more independently controllable subsets of light emitting diodes (see below). Two or more of said subsets can be arranged at different heights. In this way, horticulture light 511 may be provided to the crop(s) 1 by one or more of said subsets as function of e.g. the height of the crop 1.

The lighting device comprises a grid or 2D arrangement of LEDs, which is further elucidated below. The grid is indicated with reference 530. The grid has a grid plane 580, which is in this drawing perpendicular to the plane of drawing. The first side 531 and the second side 532 of the grid 530 are parallel with the grid plan 580, as illustrated in the FIGS. 9A-9D. Note that the first and/or the second side are not necessarily flat, as the grid may for instance comprise a wire mesh with LEDs arranged thereon.

As can be seen from FIGS. 9A-9D, the horticulture light 511 emanates from the first and/or the second side of the grid 530. The LEDs of the device, which are depicted in more detail in further figures, emit beams of light, which beams are indicated with reference 511a. These beams have optical axes 581. As can be seen in the figure, the optical axes are perpendicular to the grid plane.

Figure 2:
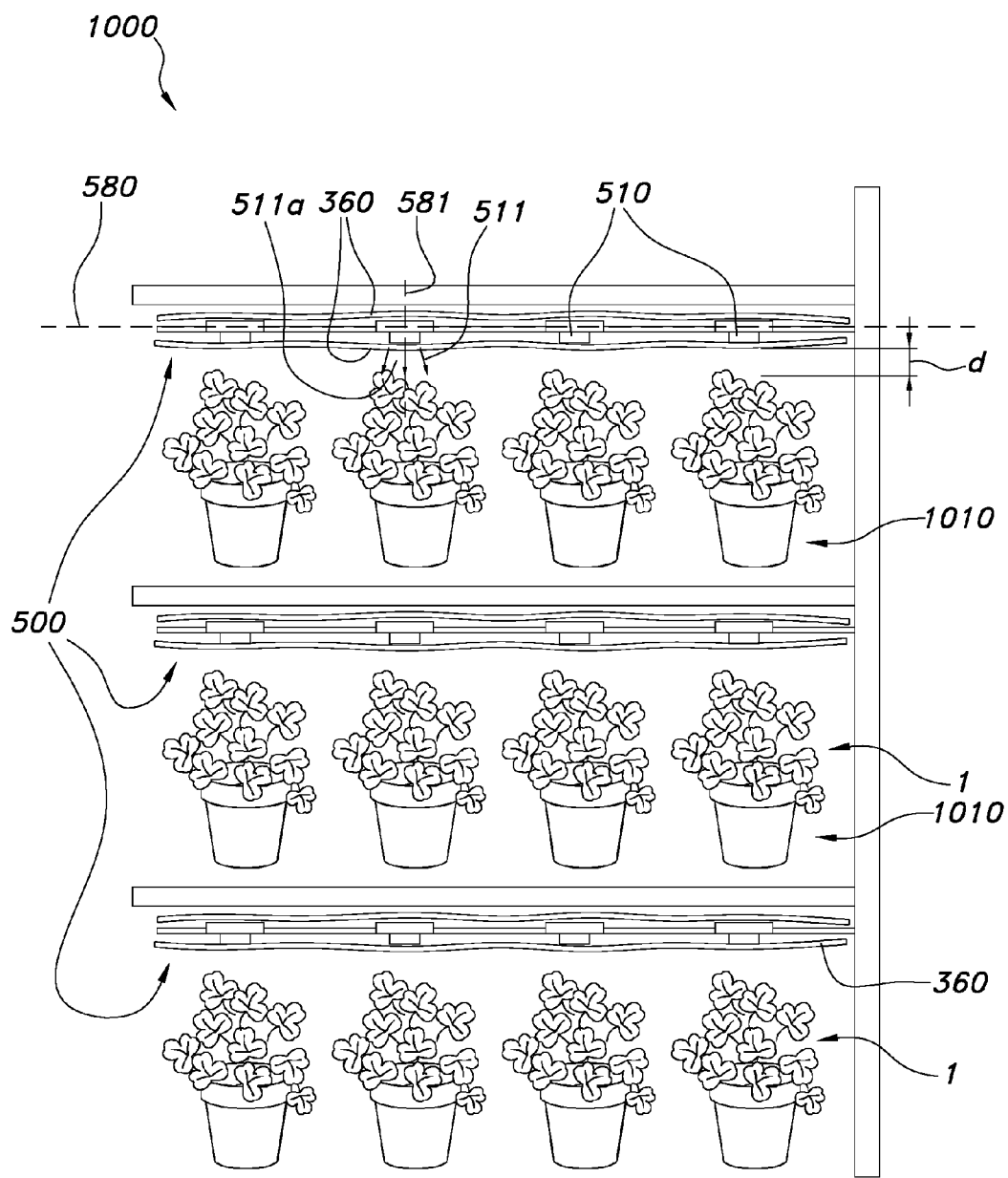

Another embodiment will be discussed next with reference to FIG. 2. In this embodiment, the lighting device 500 as described herein, is used for multi-layer growth. The multiple layers are indicated with references 1010. In this case it is beneficial that all LEDs emit in the same direction towards the plants. In this case, it may be advantageous to sandwich the LED grid in between two foils. This enables an LED grid that is mechanically more robust and better shielded from the humid environment present in plant factories. Preferably, the foil at the back of the LEDs is made diffuse reflecting by incorporating a layer that contains a white paint based on particles such as $TiO_2$. The advantage is that light that is reflected by the plant back to the light source is recycled. The foil is indicated with reference 360. The foil 360 may in an embodiment comprise trough holes (see also below).

Figure 3:
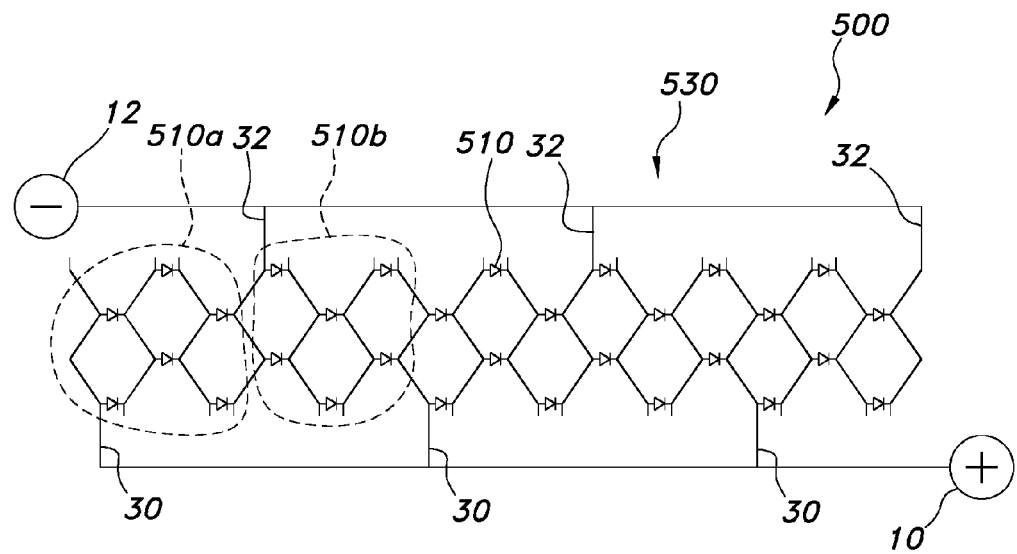
FIG. 3 shows a first example of an LED grid according to the invention with FIG. 4 showing an equivalent circuit for the LED arrangement of FIG. 3.
Figure 4:
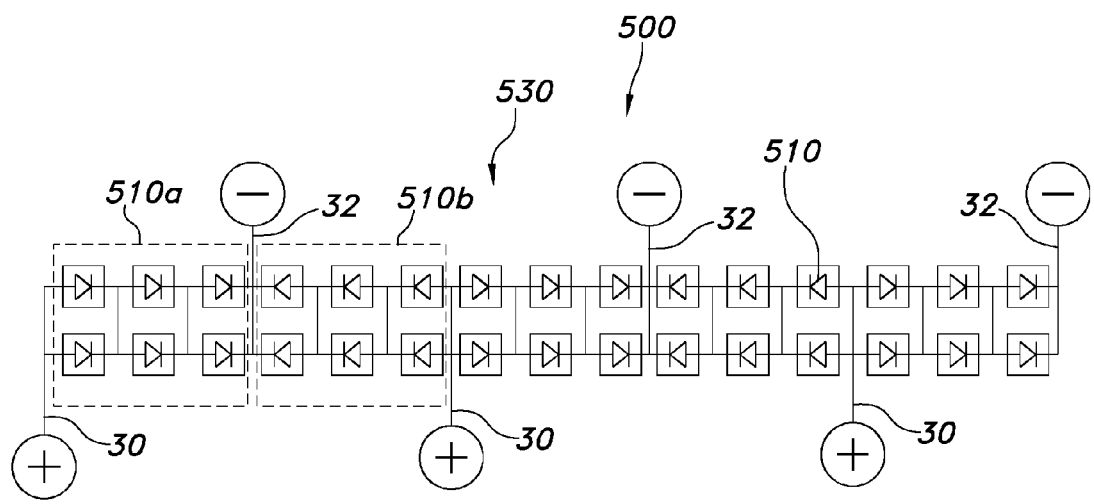

The invention also provides a LED arrangement in which LEDs are arranged in a matrix. The matrix is connected to at least three power rail lines. The LEDs are formed as a first subset of LEDs arranged between a first power rail line and a second power rail line and a second subset of LEDs is arranged between the second power rail line and a third power rail line of the same voltage as the first power rail line. This means there are alternating power rail lines interspersed with the matrix of LEDs. This enables the driving voltages to be kept low and it improves scalability of the design. A first example according to the invention is shown in FIG. 3.

The LED arrangement again comprises an grid 530 of LEDs 510 (or LED packages) arranged in a matrix, with each LED (or LED package) connected within the matrix by connecting wires, and the matrix connected to voltage rails 10,12.

The voltage rails connect to power rail lines for the LEDs 510 for supplying power. The term "power" rail line is simply used to distinguish over the (only) two "voltage" rails 10,12 to which all the power rail lines connect. A "power rail line" is simply a line to which a voltage is applied and which is used to deliver power (i.e. current) to the connected LEDs.

These power rail lines are distributed across the matrix, so that there are at least three power rail lines, which connect to the two voltage rails 10,12. There are alternating power rail lines interspersed with the matrix of LEDs. In the example shown, there are three (higher voltage) power rail lines 30 connected to the high voltage rail 10 and three (lower voltage) power rail lines 32 connected to the low voltage rail 12. The LEDs are formed as separate subset of LEDs arranged between adjacent power rail lines, wherein the adjacent power rail lines are one higher voltage power rail line and one lower voltage power rail line.

The invention can be implemented with three power rail lines, for example the first two high power rail lines 30 to the left in FIG. 3 and the first low power rail line 32. In this case, there is only a first subset of LEDs 510a between a first power rail line 30 and a second power rail line 32 and a second subset of LEDs 510b between the second power rail line 32 and a third power rail line 30 of the same voltage as the first power rail line.

Each subset of LEDs can ultimately be a single LED. It can instead be an LED packages which may include multiple LEDs. It can also be a series connection of LEDs, a parallel bank of LEDs, or a series connection of parallel banks (as in FIG. 3).

FIG. 3 shows an example where each subset of LEDs has a series connection of 3 banks of 2 LEDs in parallel. Thus, the LEDs of each subset of LEDs are placed in a 3*2 matrix: 2 in the 'parallel' direction and 3 in the 'series' direction.

For an LED voltage drop of 3V, using this approach the driving voltage 10 is fixed to 3*3V=9V.

This arrangement enables the LED matrix to be scaled in dimension in both orthogonal directions. In the example shown in FIG. 3, the power rail lines run in the column direction and they alternate in polarity in the row direction.

In this case, the LED matrix can be scaled in the row direction by increasing or decreasing the number of power rail lines. The LED matrix can be scaled in the column direction by increasing or decreasing the number of LEDs in parallel in each bank of the subset of LEDs 510a,510b.

This scaling enables the LED matrix to be made as large as desired while still keeping the same driving voltage.

Of course, the larger the LED matrix, the larger the driving current. However, this can be achieved by simply starting from a driving supply with a fixed driving voltage range and fixed driving current range, and using as many of these supplies as needed to power the whole array. Thus, the number of driving supplies can simply be correlated to the number of power rail lines 30,32.

This provides a modular approach which avoids the need to stitch separate matrices. This facilitates manufacturing of the array, for example allowing a continuous roll-to-roll manufacturing process instead of a more expensive batch process.

Figure 5:
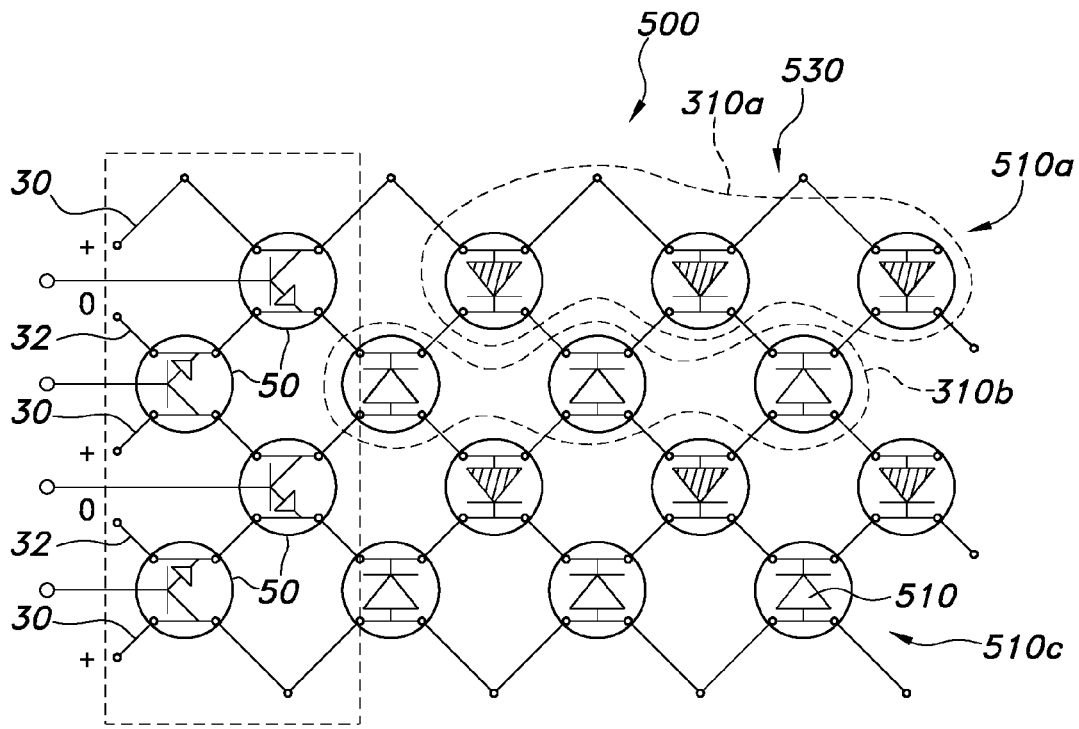
Figure 6:
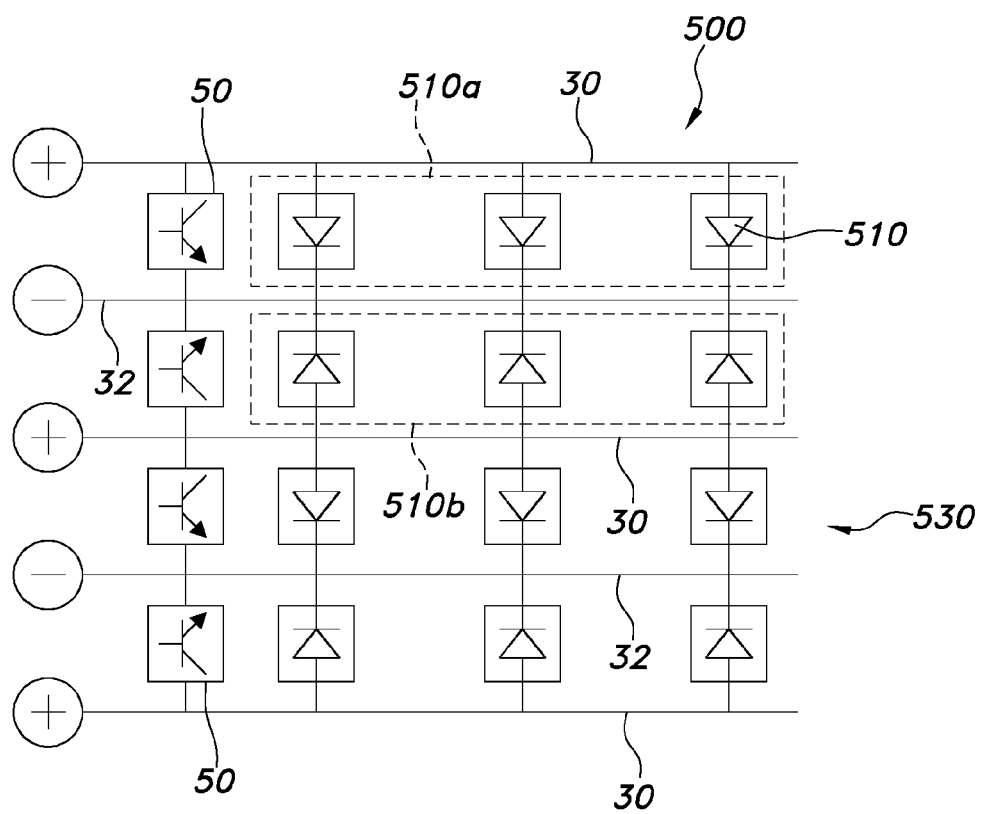
FIG. 6 showing an equivalent circuit for the LED arrangement of FIG. 5.

A second example is shown in FIG. 5, with the equivalent circuit in FIG. 6.

The LED matrix layout is conceptually the same. However, the power rail lines 30,32 run in the row direction, and each subset of LEDs 510a,510b comprises a bank of three parallel LEDs.

The LED matrix is again scalable in two directions. The row direction scaling involves changing the number of LEDs in each parallel bank, whereas the column direction scaling involves changing the number of power rail lines.

FIGS. 5 and 6 are used to show that by running the power rail lines in the row direction, it is possible to allow for row-by-row switching or dimming of rows. Of course, with a 90 degree rotation, column-by-column control is possible.

In the layout shown in FIGS. 5 and 6, each row of LEDs can be addressed individually. This is enabled by using a switch 50 such as a transistor between each adjacent pair of power rail lines. This can be used to fully or partially short-circuit the power supply responsible for a particular row. A constant-current supply will then drive current through the shorting transistor. Alternatively, a switch can be placed in series with each power supply. For this option, referring to FIG. 5, there are several sub-options:

(i) Each power rail line 30 for the high power rail (labeled with +) can be switched between a 0 and + state (and states in between for dimming). This means that two rows can be switched at a time to a dimmed or off state.

(ii) All power rail lines 30 and 32 can be switched between a 0 and + state (and states in between for dimming).

This means that an individual row can be switched on or dimmed, in addition to the two-row control of (i) above.

It is also possible to make each row (or group of rows) emit light with a different color.

FIG. 5 shows the odd rows of LEDs of one light color (shown shaded in the figure.) and the even rows of another light color (shown non-shaded in the figure).

For example, the even rows can emit a first horticulture relevant color (e.g. blue) and the odd rows emit a second horticulture relevant color (e.g. red). Using row-by-row addressing, the whole LED matrix can be controlled to emit on light having any horticulture spectral distribution (e.g. combination of blue and red). Dynamic patterns can also be created along the row or column direction (depending on the configuration of the power rail lines).

The invention can be applied in large area LED matrices for numerous applications such as for example full height high-wire horticulture growth.

The LEDs can be of known design, and for this reason they have not been described in detail. They comprise discrete packaged components to which the wire connections can be made. The matrix of wires and LEDs can be encapsulated in a transparent membrane.

The matrix of wires and LEDs can also be laminated to a flexible substrate such as a canvas or carpet. The wires can be conducting wires that are weaved into a textile.

In the examples shown, the two voltage rails are shown as "+" and "−" or "+" and "0". All that is needed is a voltage difference in order to suitably bias the LEDs. Thus, the actual voltages are not relevant-they may both be positive or both be negative.

As mentioned above, the power rail lines are distributed across the area of the matrix.

In the example of FIG. 3, the power rail lines alternate between the two voltages in the row direction, and the power rail lines run essentially in the column direction. Thus, from left to right (i.e. in the row direction) there are evenly spaced power rail lines alternating in polarity. To avoid crossovers, the power rail lines of one polarity extend up to connect to one of the voltage rail lines, and the power rail lines of the other polarity extend down to connect to the other of the voltage rail lines.

In the example of FIG. 5, the power rail lines alternate between the two voltages in the column direction, and the power rail lines run essentially in the row direction. Thus, from top to bottom (i.e. in the column direction) there are evenly spaced power rail lines alternating in polarity.

In general, the power rail lines are distributed substantially uniformly across the grid area. By "substantially uniformly" is meant "uniformly if edge influences are ignored". This means that the grid can be cut to size. The designs of FIG. 3 and FIG. 5 can each be cut to size in the row and column directions.

Each LED 510 shown in the Figs. can be an LED package of one or more LEDs.

As explained above, the invention (at the limit) can use only three power rail lines. However, there are preferably at least 4 power rail lines, and more preferably 10 or more, for example more than 20. The more power rail lines, the more ability to tailor the size of the LED grid.

Figure 7A:
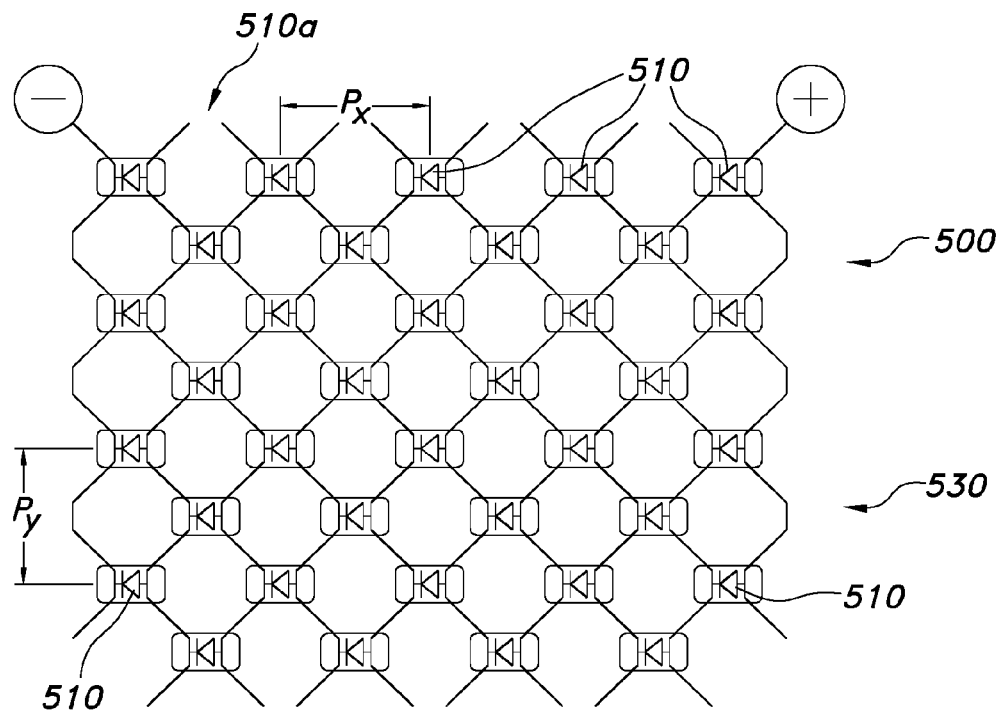
FIG. 7a-7i schematically depict some examples.
Figure 7B:
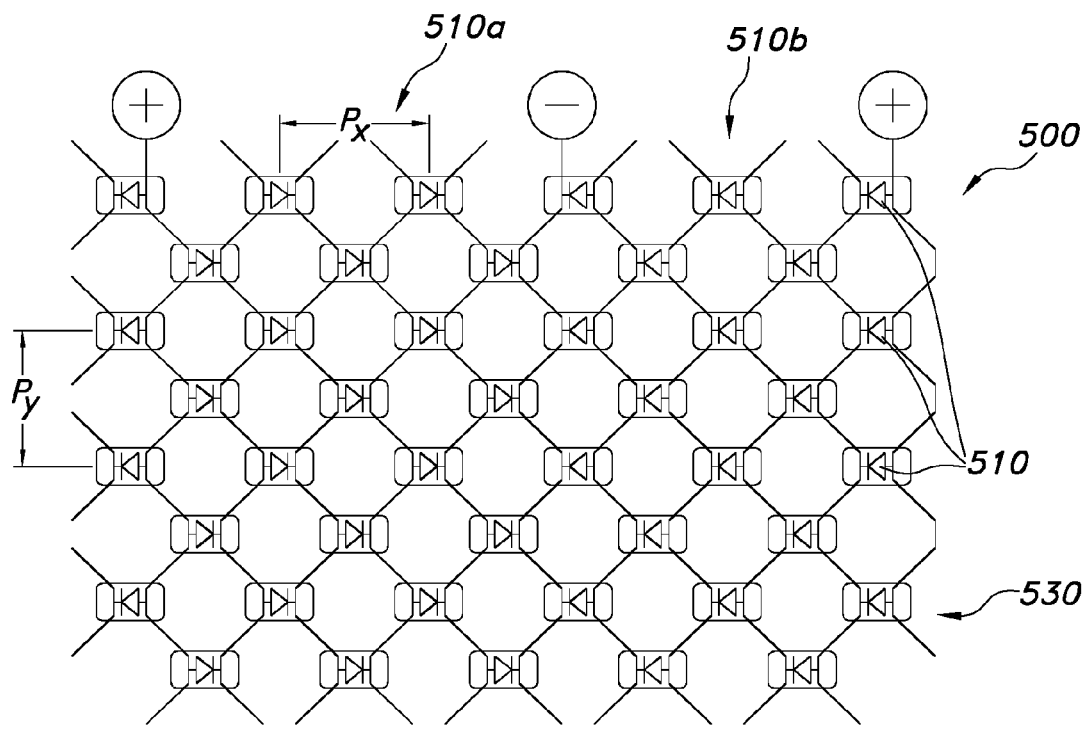

FIGS. 7a and 7b schematically depict some further embodiments, analogous to those of FIGS. 3-6. The different subsets are indicated with references 510a, 510b, etc. As depicted in FIG. 7b, by placing the LEDs in sections with opposite polarity, the driving voltage can be kept low and tuned to an optimum value (optimum from the point of energy consumption, cost, and safety for example). With this method, the LED grid can be scaled to dimensions (in both directions) as preferred while keeping the same driving voltage. Of course, the larger the LED grid, the larger the driving current. Still, this can be achieved by simply starting from a driver supply with a fixed driving voltage range and a fixed driving current range and using as many of these supplies as needed to power the whole grid. In this manner, a modular approach is made possible. Furthermore, there is no need to stitch separate LED grids together as the whole grid can be made in a continuous process. Reference Px and Py indicate the pitch in the x and y-direction, respectively.

With the proposed method of connecting the LEDs it is relatively easy to allow for switching or dimming of rows (or columns) or a combination of rows (or columns). In the layout shown in FIG. 7c, each combination of three rows of LEDs is addressed individually. This is done by using a switch (e.g. a FET) to short-circuit the constant current supply responsible for that combination of rows. Alternatively, a switch is put in series with each power supply. Dimming of each combination of rows can be achieved by pulse-width-modulation of the signal at the gate of the FET.

Figure 7C:
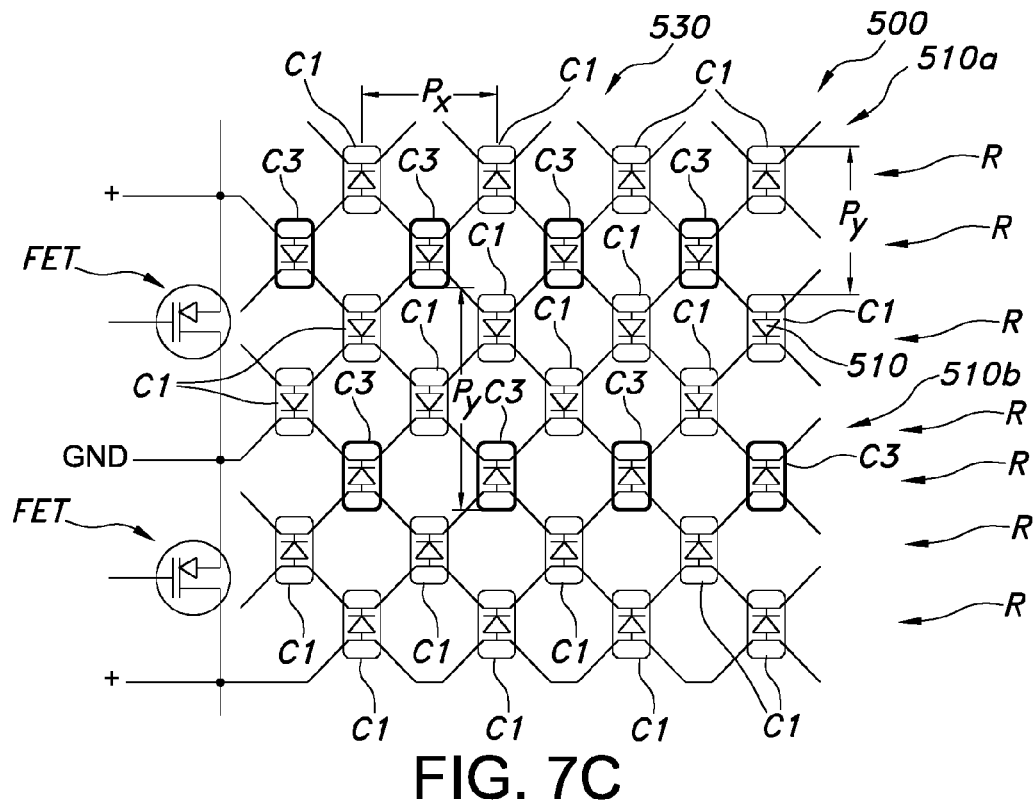

In FIG. 7c, rows are indicated with the letter R and differently light emitting LEDs are indicated with C1 and C3, wherein by way of example C1 relates to red and C3 relates to blue. From top to bottom, the 7 rows are red, blue, red, red, blue, red and red light emitting rows that may individually be controlled. The rows having the same color may be a single subset, which is controlled, or may include a plurality of the same subsets of which each subset may individually be addressed. Hence, in the former embodiment, all "red rows" may be switched on and off all together, whereas in the latter embodiment, one may select one or more "red rows".

Figure 7D:
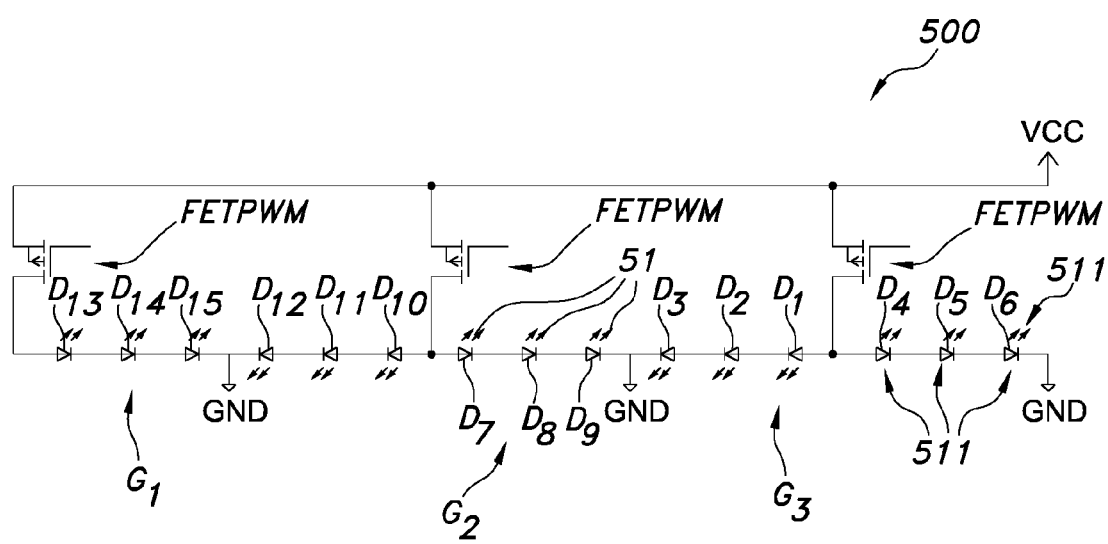

In FIG. 7d we show another layout. Amongst others, this layout has actually been built and proven to work fine. Note that the individual LEDs in the drawing are actually groups of LEDs in parallel. Contrary to the case in FIG. 7c, now all grounds (labeled GND in the figure) can be connected. The same holds for the positive voltages (VCC in the figure). Note that FET PWM_CH2 switches group 2 (LEDs D7-D12). In the figure, all labels to the FETs are the same.

Figure 7E:
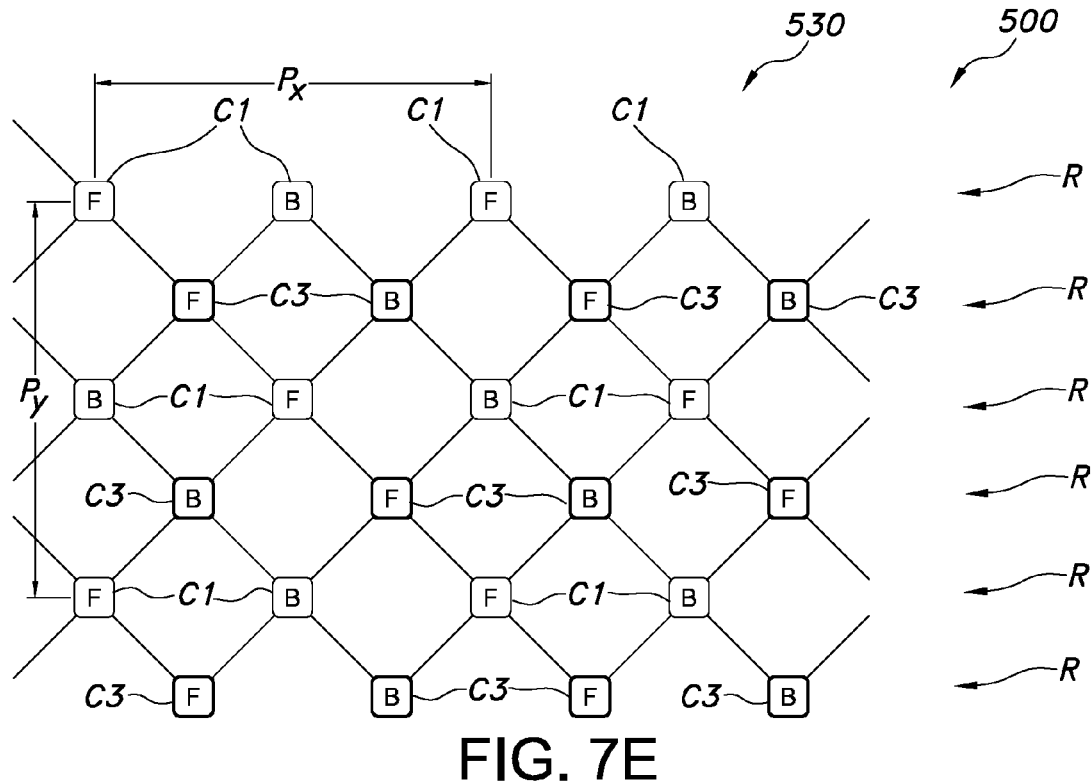
Figure 7F:
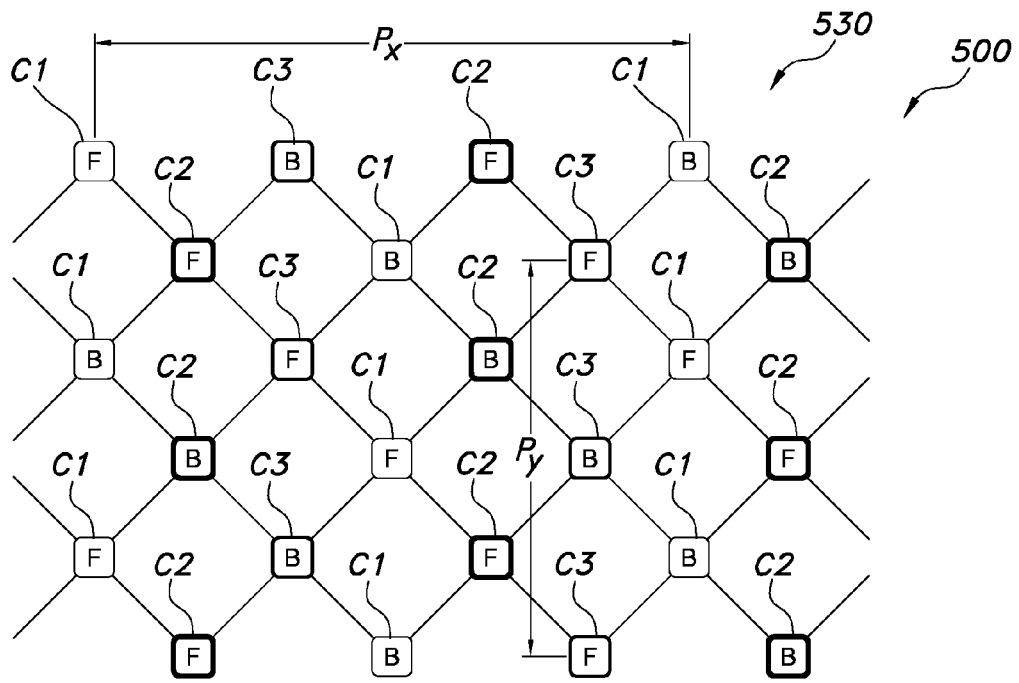

In FIG. 7e we show how we can combine different types of LEDs emitting in different parts of the spectrum into a single grid layout. The layout is such that the sub-grids established by LEDs of the same type is again a regular grid (square or hexagonal), resulting in an optimum uniformity of the produced illumination pattern. Consider for example the red LEDs emitting in the forward direction (labeled F) in FIG. 7. They establish a sub-grid that has an LED spacing that is equal for the x direction and y direction (Px and Py in FIG. 7 are equal). This is a prerequisite for obtaining a uniform illumination distribution (which is in general desired, although the lighting device may also comprises layers of subsets (see also above)). In FIG. 7e, rows R of blue (C3) and red (C1) LEDs alternate; further LED's 510 emitting to one side and emitting to another side alternate. The reference "F" refers to forward emission, and the reference "B" refers to backward emission, In FIG. 7f an LED grid is shown based on three types of LEDs. The LEDs are again ordered such that their direction of emission alternates between the forward and backward direction. In this case, it is not possible to arrive at a sub-grid for the individual types of LEDs that have a square or hexagonal geometry.

Dependent upon the construction, C1, C2 and C3 may all belong to different subsets. However, additionally or alternatively, LEDs lighting from the back (B) or lighting from the front (F) may be comprised by two (or more) different subsets.

Figure 7G:
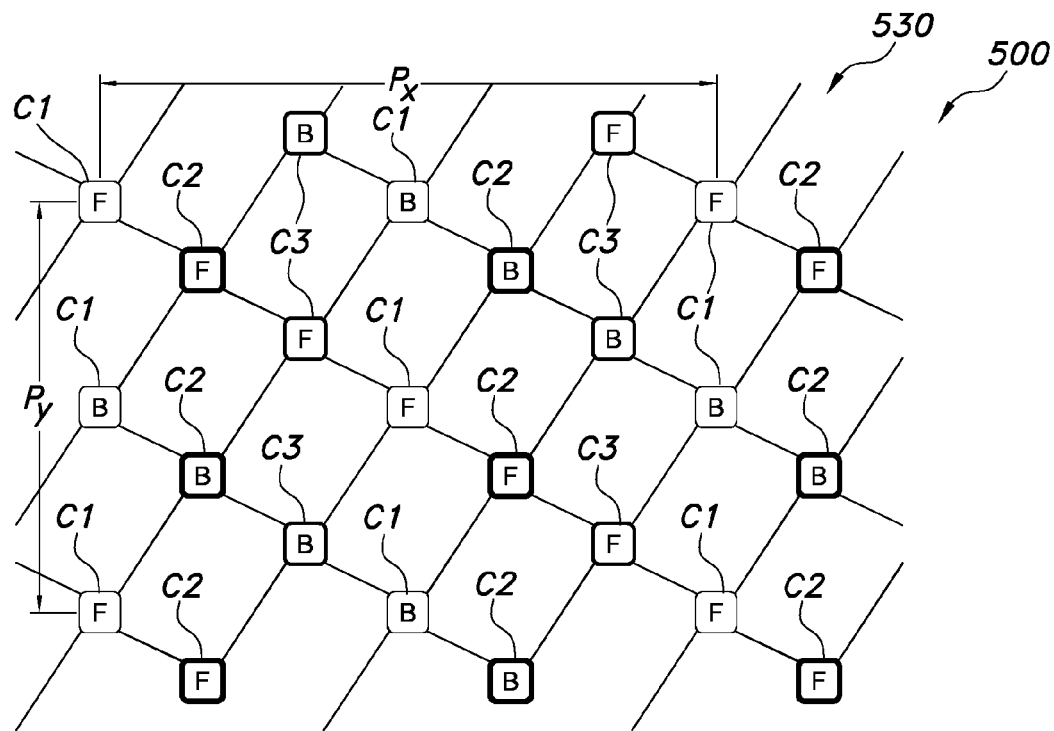

As shown in FIG. 7g, this can be remedied by shearing the grid and allowing the interconnections between the individual LEDs to have different lengths (Px and Py can now again be made equal). Reference C1 refers to red while reference C3 refers to blue. Reference C2 may for instance refer to yellow, which is included in the PAR spectrum.

Figures 7H, 7I:
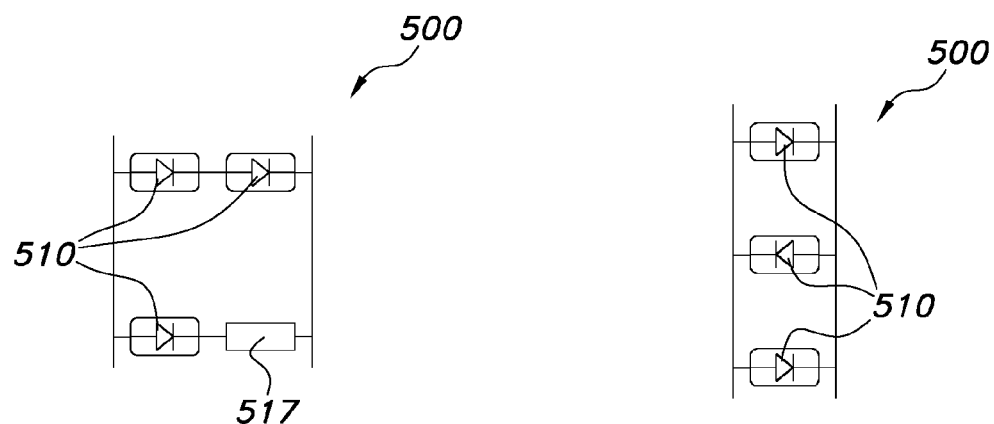

In general, in the LED grid, LEDs of the same type, e.g. characterized by having the same forward operating voltage, may be placed in parallel whereas LEDs of different types may be placed in series. Sometimes however, it may be convenient to have LEDs of different types arranged in parallel. In case the LEDs required different forward voltages, the different types of LEDs will conduct a different current and therefore result in a different light output. This can be remedied to some extend by placing a resistor in series with the type of LED that requires the lowest forward voltage. An embodiment is schematically depicted in FIG. 7h: two red emitting LEDs are placed in series and placed in parallel with a blue LED. The two red LEDs in series typically require 2×2.9=5.8 V whereas the blue LED requires 3.1 V for the same current (say 0.2 A) through each of the LEDs. To achieve this, a resistor is put in series with the blue LED. For this particular example the resistance should be R=(5.8−3.1)/0.2=13.5Ω. Hence, LEDs 510 with different operating voltages may nevertheless be placed in parallel, when a suitable resistance, indicated with reference 517, is included. Some or all of the LEDs in the LED grid can also be placed anti-parallel, as shown in the example in FIG. 7I. In this example, red and blue LEDs are placed in anti-parallel. By changing the polarity of the voltage across the LEDs, the color emitted can be changed from red to blue and vice-versa.

Figure 8A:
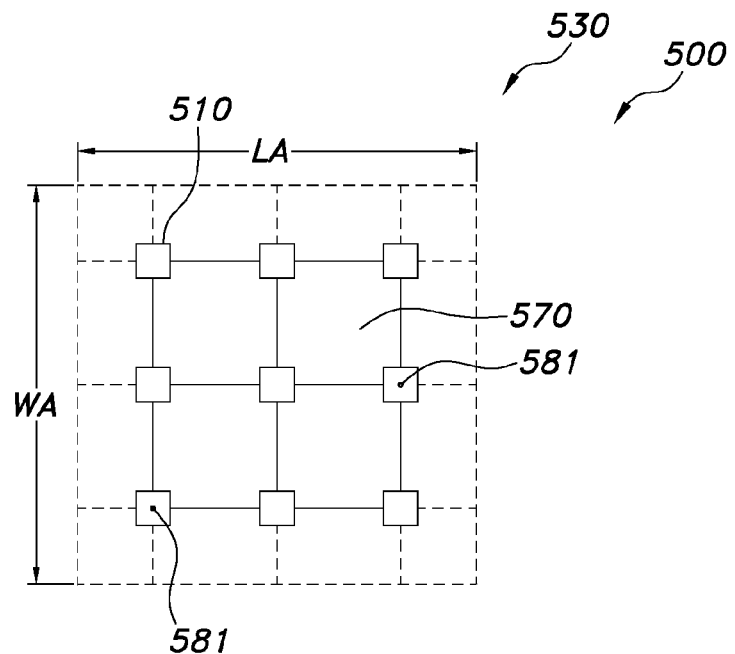
FIGS. 8a-8c schematically depict some aspects of the invention.

FIG. 8a very schematically depicts an embodiment of the lighting device 500, with a LED grid 530 shown as a 2D array. The array has a length LA and a width WA. Between the LEDs 510, through holes 570 may be present extending from the first side of the LED grid to the back side of the LED grid. The through holes may have cross-sections. The sum of the cross-sectional areas of the through-holes 570 may in an embodiment be at least 50% of the surface area of the array (i.e. LA*WA; one may also indicated this as the grid area).

Figure 8B:
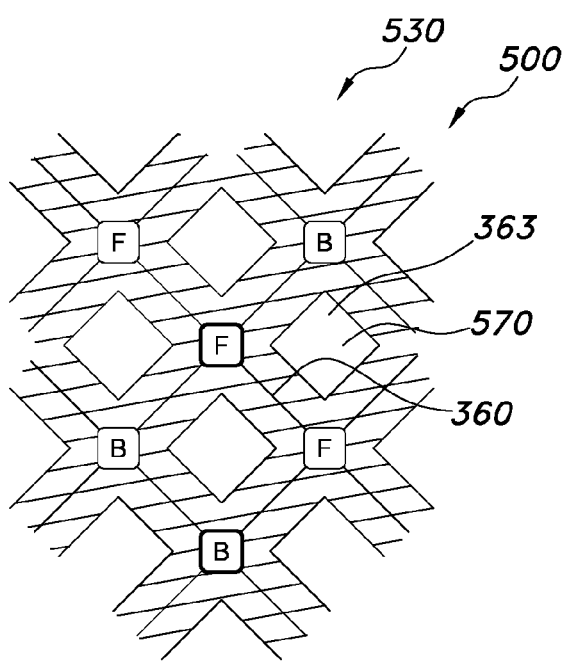
Figure 8C:
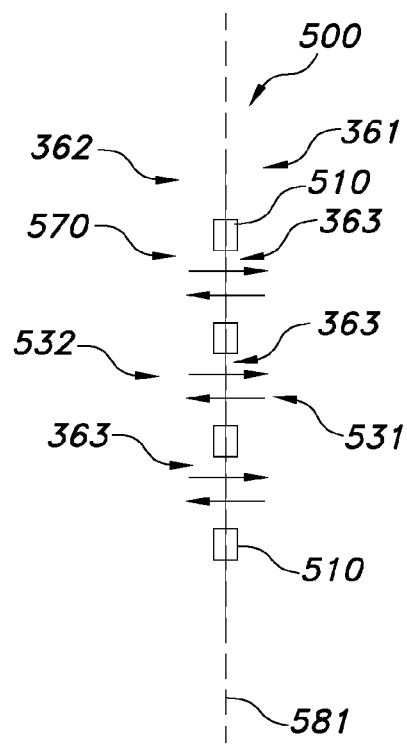

A further embodiment is schematically depicted in FIG. 8b. Greenhouses and plant factories represent a hostile environment for electronics due to the presence of a high humidity and temperature and corrosive salts used as nutrients for the plants. Luminaires therefore need to comply with IP (International Protection Rating) regulations (e.g. IP66). By sandwiching the LED grid in between transparent plastic foils, such regulations can be met. Locally, the foils can be open in order not to hinder air flow and therefore prevent the formation of (local) microclimates. The foil is indicated with reference 360; through holes are indicated with reference 363. The through holes in the foil are from a front side 361 of the foil 360, to a back side 362 of the foil 360. The through holes 363 of the foil 360 may substantially coincide with the through holes 570 in the LED grid 530. FIG. 8c schematically depicts a side view wherein the front side of the grid is depicted at the left side and the back side is depicted at the right. Potential gas flow through holes 363 is indicated with the arrows in both directions.

The LED grid can also be covered with a thin transparent plastic layer (e.g. by immersion in a plastic pre-cursor or resin that is (then) cured by UV radiation). Alternatively, the transparent layer can be formed by molding a transparent material (e.g. Silicone) over the LED grid structure.

Figure 9A:
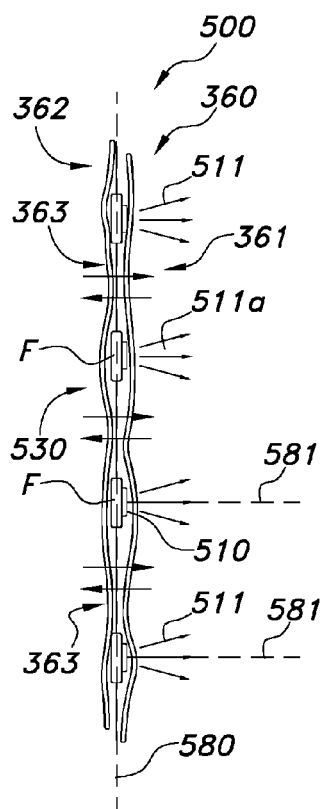
FIGS. 9a-9d schematically depict some further examples. The drawings are not necessarily to scale.
Figure 9B:
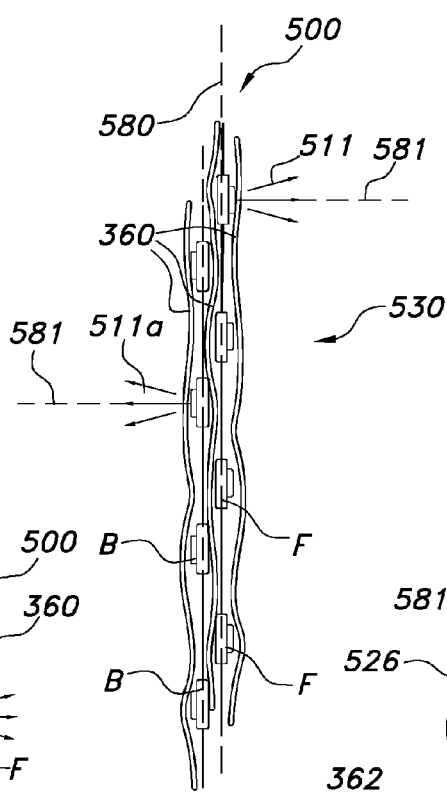
Figure 9C:
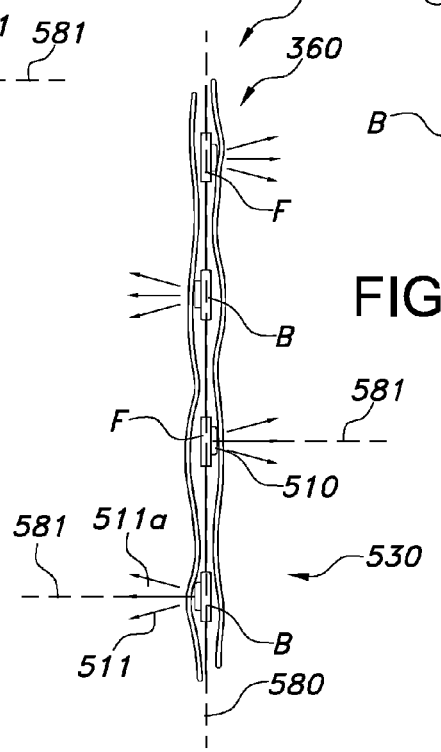
Figure 9D:
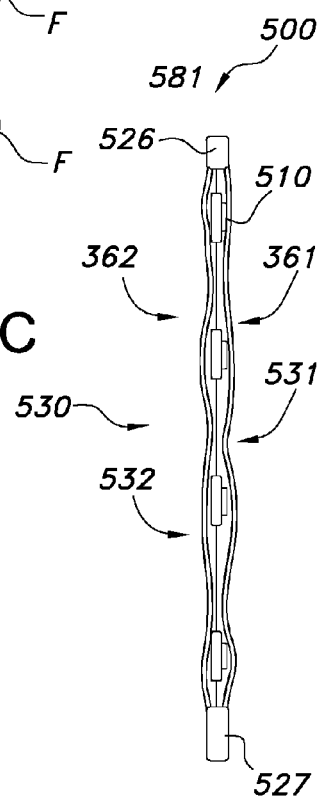

FIGS. 9a and 9b schematically depict such LED grid 530 embedded in a foil 360, wherein in FIG. 9a all LEDs 510 provide light (when driven) in one direction, away of the first side 361, and wherein in FIG. 9b, the LEDs 510 are configured to provide light (when driven) in both directions, i.e. away from the first side 361 and away from the second side 362. The LEDs are therefore also indicated with the letter F and B respectively. A double sandwich construction, combining two separate LED grids into one, is shown in FIG. 9c. A mounting arrangement for an LED grid in a greenhouse is shown in FIG. 9d. Reference 526 indicates a mounting bracket, and reference 527 indicates a counter weight. Of course, other configurations such as frames may be possible as well In all FIGS. 9a-9d the LEDs 510 are configured to provide the horticulture light 511 in beams of light having optical axes 581 configured perpendicular to said grid plane 580. However, in FIGS. 9b and 9c, one or more subsets of LED(s) 510 are configured to provide beams of light in an opposite direction to the LED(s) 510 of one or more other subsets. This leads to the LEDs 510 being indicated with Bs and Fs.

For photosynthesis, plants are sensitive in the wavelength region from 400 nm to 700 nm. All radiation in this wavelength window is called photosynthetically active radiation (PAR). Also, by approximation, all photons having a wavelength within this window contribute equally to photosynthesis. This is why the amount of PAR radiation is traditionally expressed in the amount of photons per second, indicated by the unit μmol/sec (a mol is the SI unit for the amount of substance; its value is $6.02 \times 10^{23}$).

For LED lighting in horticulture, mainly blue LEDs (450 nm) and red LEDs (625-675 nm) are used. Instead of blue LEDs also white LEDs may be used. Alternatively, in addition to one or more of blue and red LEDs, white emitting LEDs may be applied. LEDs emitting in the green part of the spectrum are much less efficient. Also photosynthesis is somewhat less efficient for green. It is further noted that plants respond different to different colors of light. In horticulture, the photosynthetic photon flux density (PPFD) is measured in number of photons per second per unit of area (in μmol/sec/m$^2$; a mol corresponding to $6 \cdot 10^{23}$ photons). In practice, when applying inter-lighting for tomatoes, the red PPFD used is for example 200 μmol/sec/m$^2$ where a ratio blue:red=1:7 is typically used (with red and blue regions from 625-675 nm and from 400-475 nm).

Figure 10:
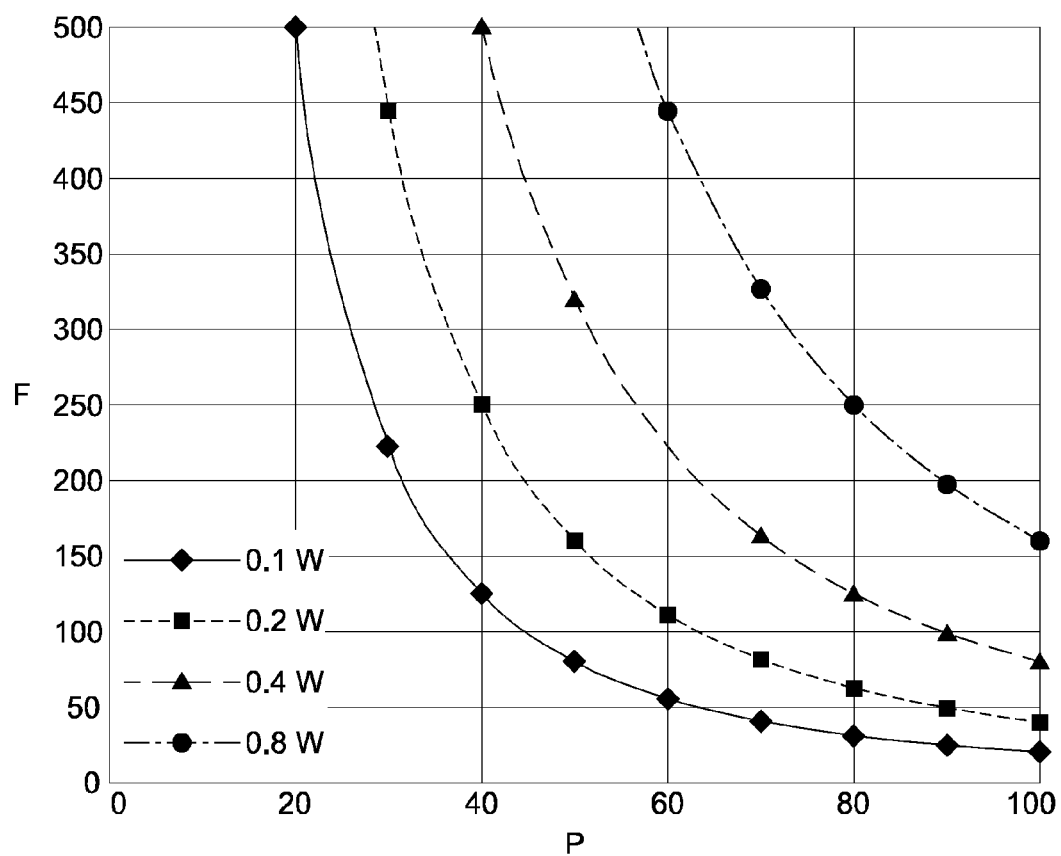
FIG. 10 shows the photon flux (F) emitted by an LED grid as a function of LED pitch, for several LED electrical powers (P). Herein it is assumed the LEDs are arranged in a square grid and emit towards one side only. The efficiency of the LEDs is taken to be 2 $\mu$mol/sec/$W_{elec}$ of PAR radiation (a reasonable—albeit somewhat high—value for blue, red, and far-red LEDs).

In FIG. 10 it is shown how the optimum LED pitch depends on the LED power (Watt) and the required illumination flux at the crop. The y-axis indicates the flux in μmol/sec/m$^2$ and the x-axis the pitch P in mm.

Figure 11:
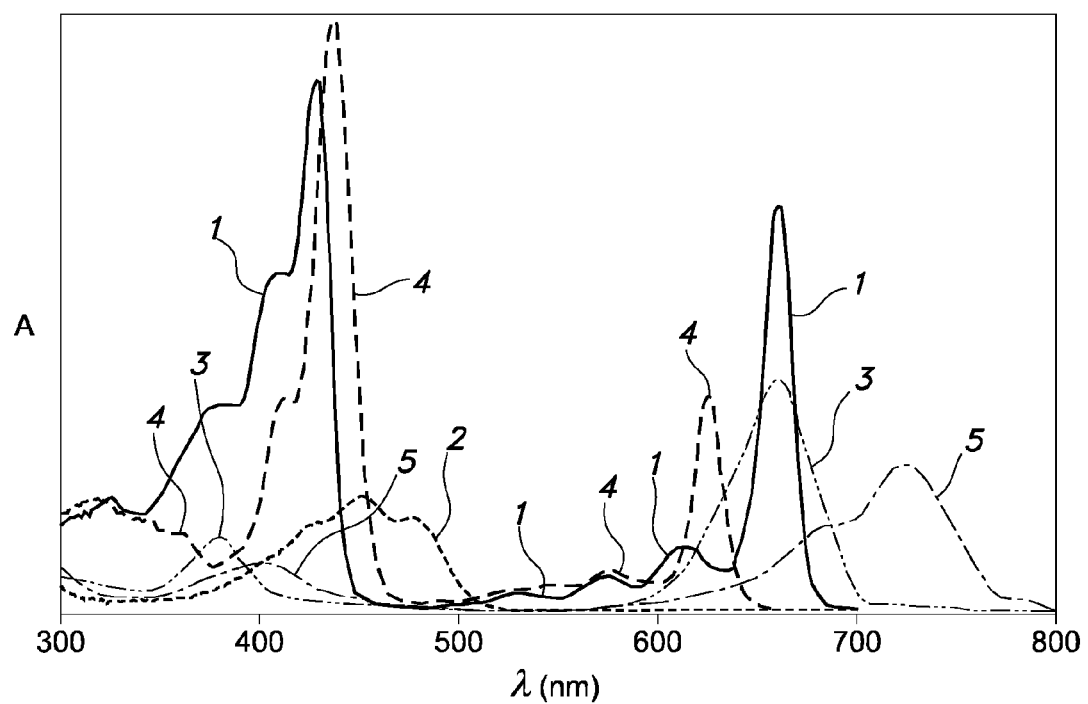
FIG. 11 depicts relative absorption spectra of some common photoreceptors in green plants.

FIG. 11 depicts relative absorption spectra of some common photoreceptors in green plants, with 1 representing chl a, 2 representing Beta carotene, 3 representing phytochrome (Pr), 4 representing chl b, and 5 representing phytochrome (Pfr). On the x-axis the wavelength is represented and on the y-axis the absorption of those photoreceptors (in arbitrary units). This invention can be applied in horticulture for providing supplemental illumination to high-wire crops like tomatoes as well as multi-layer lighting in plant factories (in other words, this invention can be applied in a major part of the horticulture market).

Herein, we present an LED-based supplemental lighting luminaire for e.g. high-wire crops in green houses as well as for multi-layer growth in plant factories. The luminaires are applicable to most of the horticulture market. For high-wire crops, the luminaires provide lighting in between the rows of the plants, i.e. there where they receive a relatively low amount of natural light.

The luminaires are based on grids of LEDs that are transparent for light, non-obstructive for air, emit towards both sides, and have a topology of connecting wires that allows combining and selecting different colors of LEDs at different heights while still resulting in a uniform illumination. The method as disclosed represents a low-cost solution for horticulture.

The invention claimed is:

1. A method for providing horticulture light in a horticulture environment, the horticulture environment comprising a crop having a vertical height that is measurable along an axis that is substantially vertical to ground level; the method comprising:
    illuminating the crop with the horticulture light of a lighting device, wherein at least some of the horticulture light is applied in a direction substantially perpendicular to said axis;
    wherein the lighting device comprises a grid that is substantially planar, the grid comprising a 2D arrangement of a plurality of light emitting diodes (LEDs) and a plurality of through holes; and,
    positioning the grid substantially vertical to the ground whereby one or more of the plurality of LEDs are configured to provide said horticulture light and the through holes are configured to reduce obstruction by the lighting device of gas and/or pollination flows in the horticulture environment and
    wherein the plurality of LEDs are embedded in a transparent foil, wherein the transparent foil comprises through holes from a first side of the foil to a second side of the foil, wherein the foil has a foil surface area, and wherein the through holes have cross-sectional areas, wherein the total area of the cross-sectional areas of the through holes is in the range of 50-95% of the foil surface area.

2. The method according to claim 1, wherein the grid defines a grid plane, and wherein the LEDs are configured to provide said horticulture light in beams of light having optical axes, and wherein the LEDs arranged such that said optical axes are perpendicular to said grid plane.

3. The method according to claim 1, wherein the plurality of light emitting diodes comprises two or more subsets of LEDs, wherein the LEDs of one or more of said subsets are configured to provide horticulture light in a first direction and wherein the LEDs of one or more other subsets are configured to provide horticulture light in a second direction opposite the first direction.

4. The method according to claim 1, wherein the plurality of LEDs comprises two or more independently controllable subsets of LEDs, wherein two or more of said subsets are arranged at different heights relative to a vertical arrangement of the grid.

5. The method according to claim 4, wherein the plurality of LEDs comprises two or more independently controllable subsets of LEDs, wherein at least two of said subsets are configured to generate light having different spectral distributions, and wherein the method further includes varying the spectral distribution of the horticulture light as a function of one or more of (a) a part of the crop being illuminated, (b) a time of the day, (c) a light intensity and light distribution of other light than the horticulture light provided by the lighting device, (d) a type of crop, (e) a growth stage of the crop, (f) a stage of a fruit, (g) a time to harvest, (h) a time from harvest, and (i) a position in a horticulture arrangement comprising a plurality of crops.

6. The method according to claim 5, wherein a first group of one or more of said subsets are configured to provide light having a first wavelength selected from the range of 400-475 nm, and wherein a second group of one or more of said subsets are configured to provide light having a second wavelength selected from the range of 625-800 nm, wherein the second group is different from the first group.

7. The method according to claim 1, wherein the plurality of LEDs have a pitch, wherein the pitch is a nearest mutual distance between two neighboring LEDs, and wherein the LEDs are arranged at a predetermined distance from the crop being illuminated.

8. The method according to claim 7, wherein a ratio of the pitch between two neighboring LEDs and the predetermined distance of the neighboring LEDs to the crop is at least 0.25.

* * * * *